Figure 15:
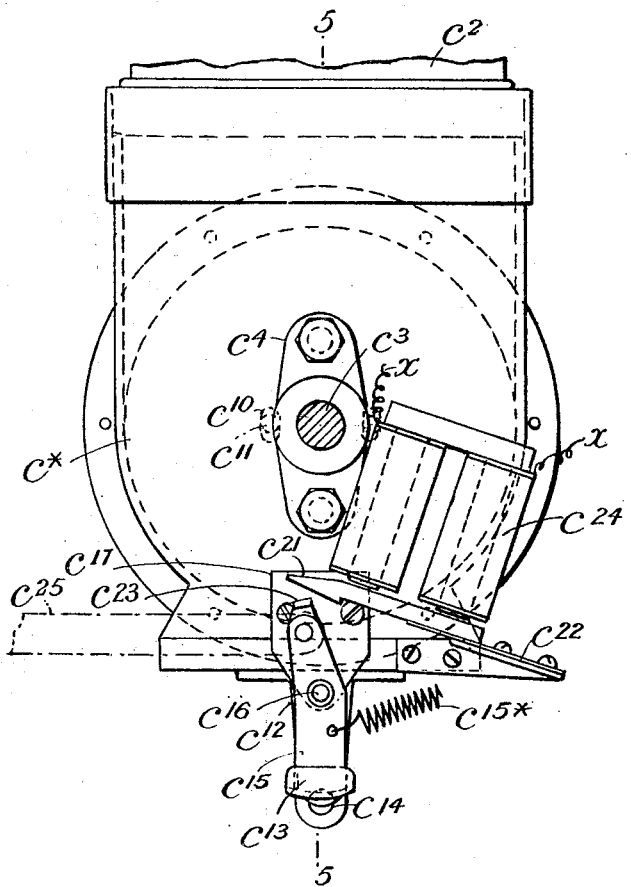

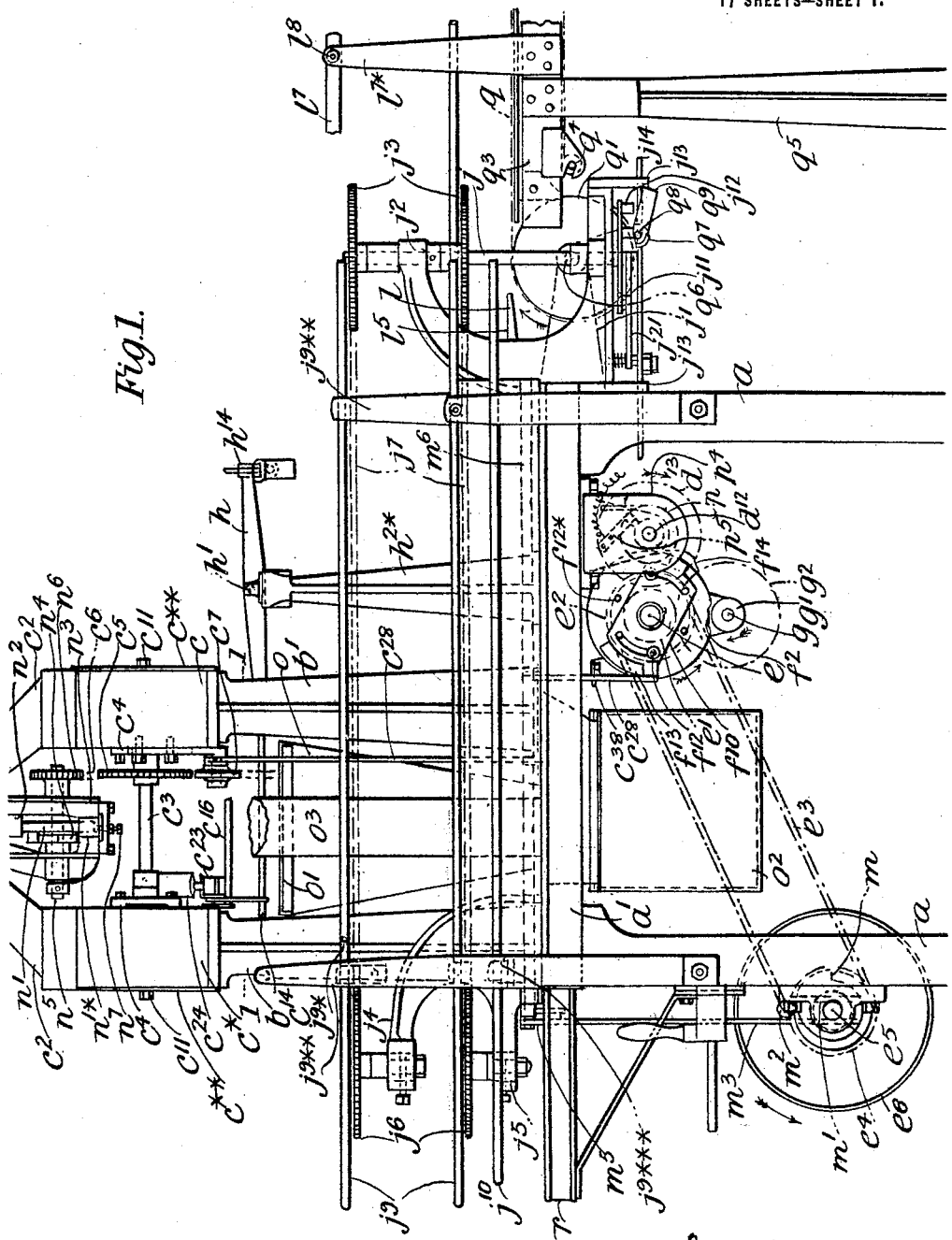

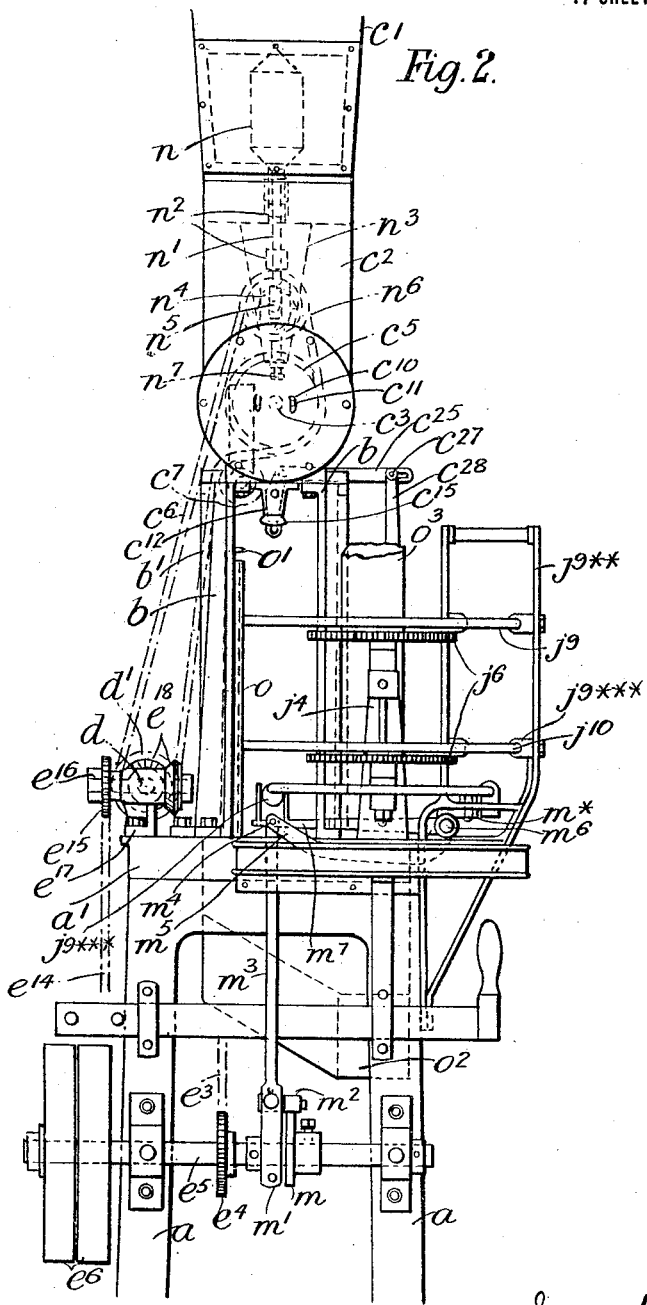

G. PROKOFIEW.
AUTOMATIC MACHINE FOR PACKETING, WEIGHING, AND DELIVERING GIVEN QUANTITIES OF GRANULAR OR POWDERY MATERIAL.
APPLICATION FILED MAY 20, 1911.
1,137,284.
Patented Apr. 27, 1915.
17 SHEETS—SHEET 3.
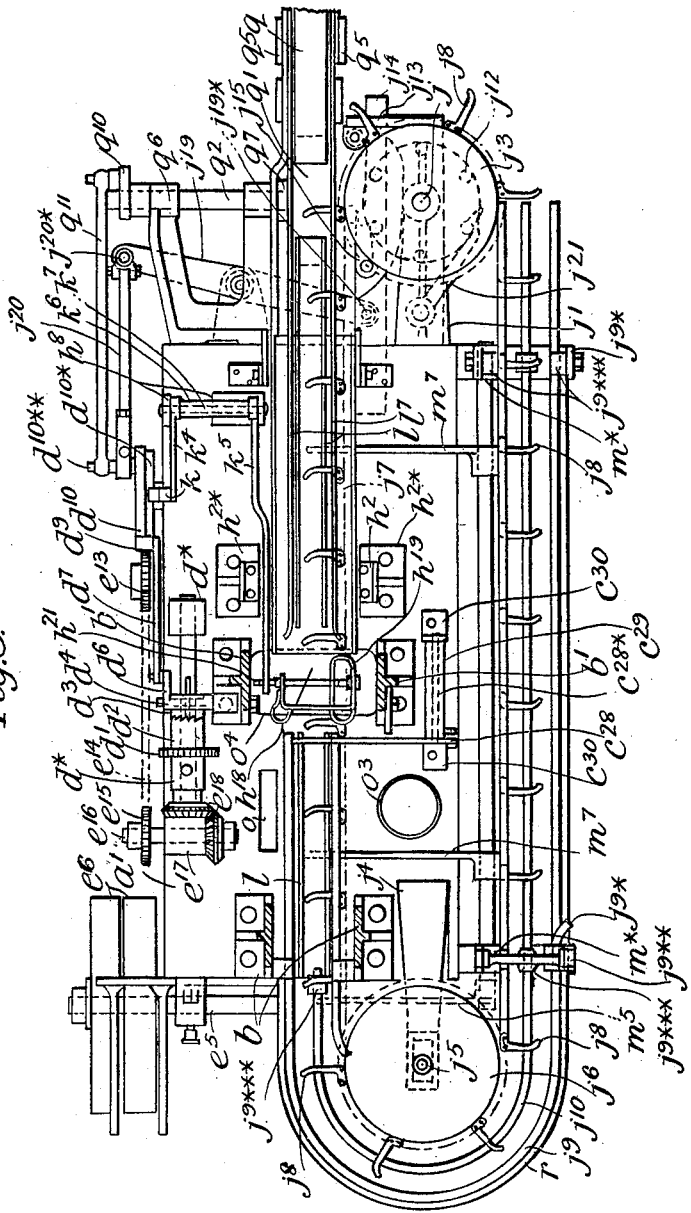

G. PROKOFIEW.
AUTOMATIC MACHINE FOR PACKETING, WEIGHING, AND DELIVERING GIVEN QUANTITIES OF GRANULAR OR POWDERY MATERIAL.
APPLICATION FILED MAY 20, 1911.
1,137,284.
Patented Apr. 27, 1915.
17 SHEETS—SHEET 4.
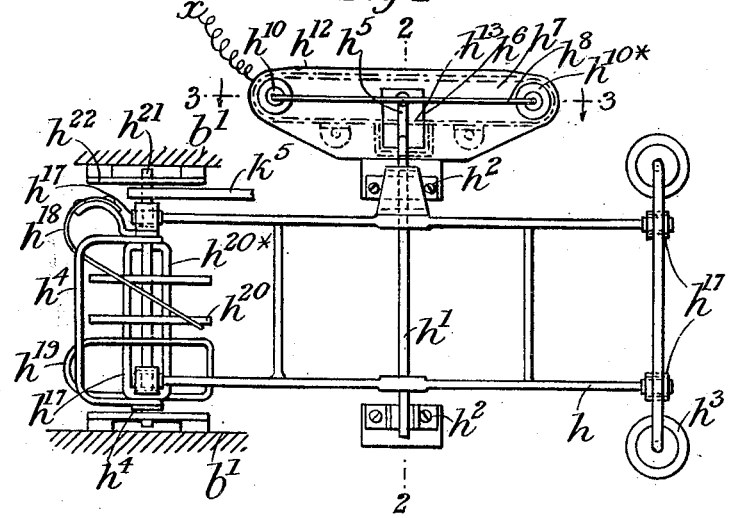
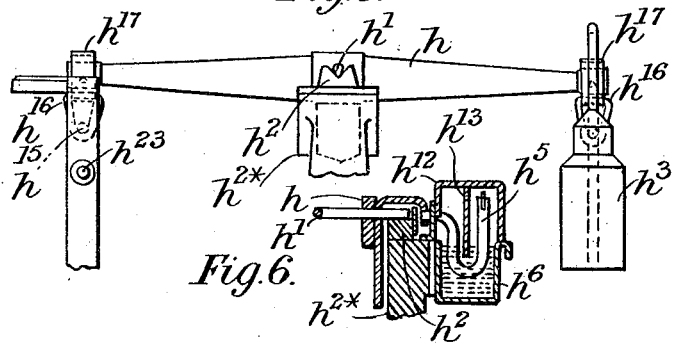
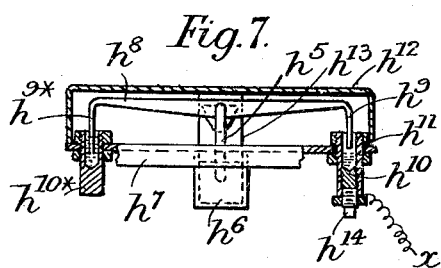

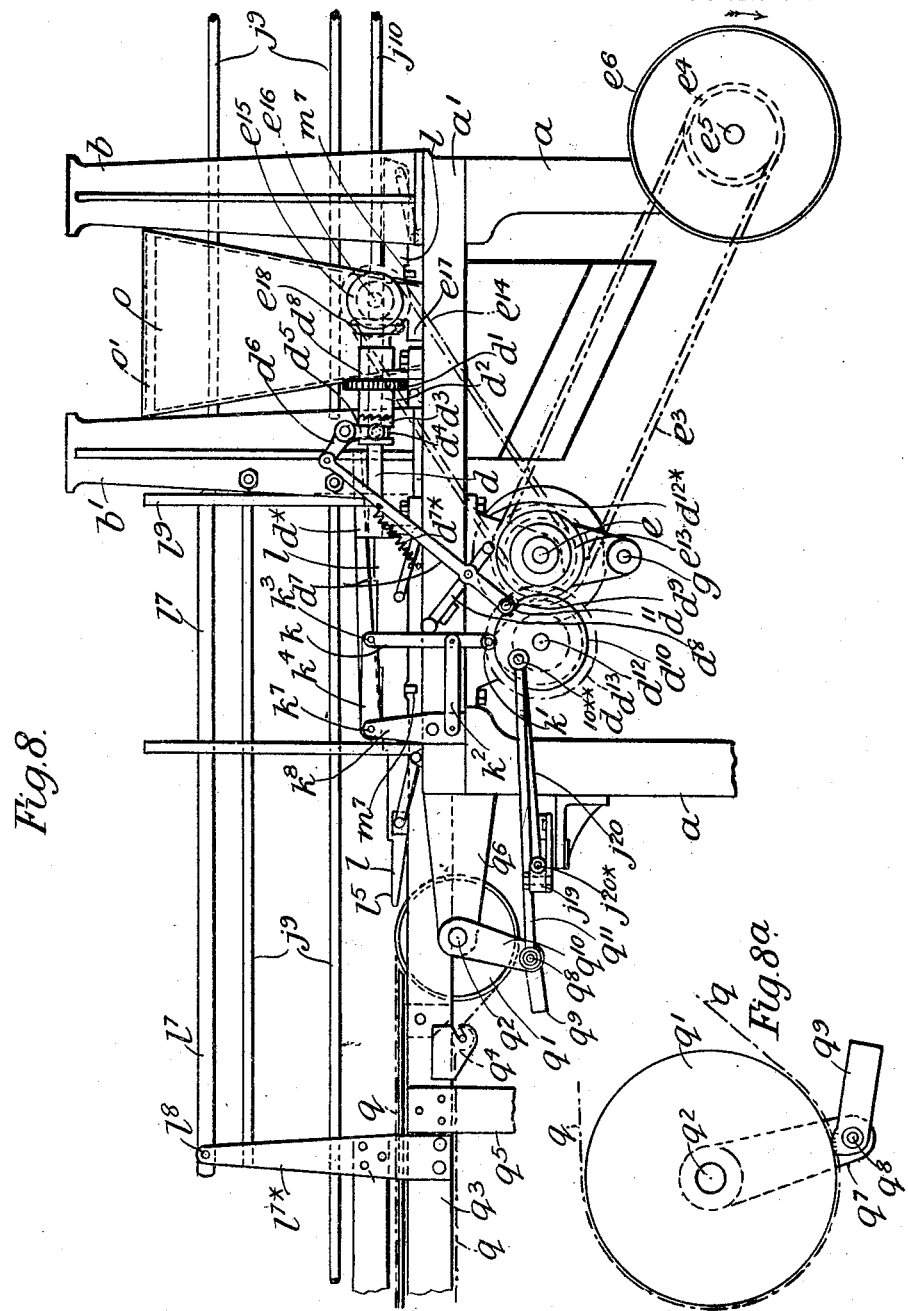

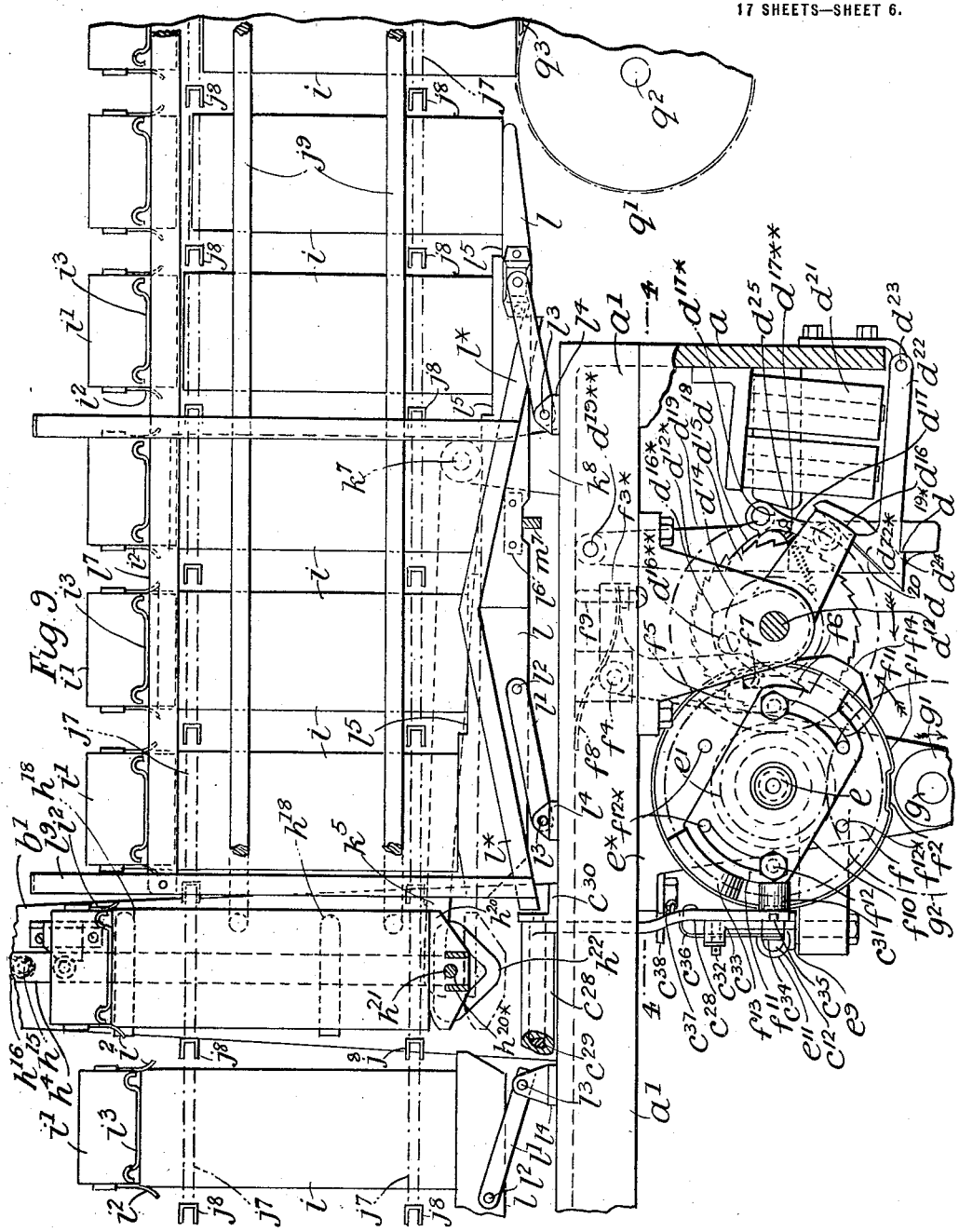

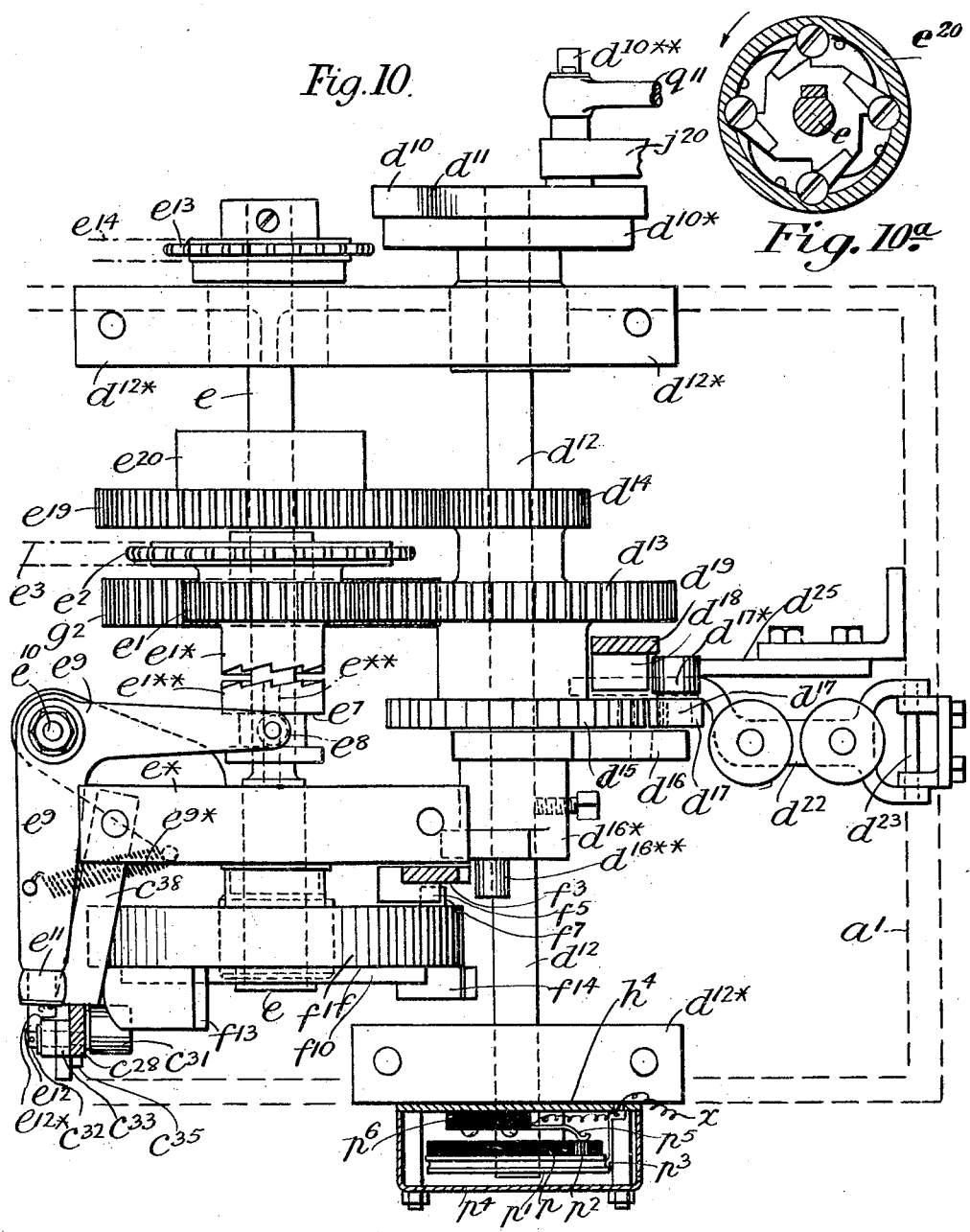

G. PROKOFIEW.
AUTOMATIC MACHINE FOR PACKETING, WEIGHING, AND DELIVERING GIVEN QUANTITIES OF GRANULAR OR POWDERY MATERIAL.
APPLICATION FILED MAY 20, 1911.
1,137,284.  Patented Apr. 27, 1915.
17 SHEETS—SHEET 8.
Fig. 11.
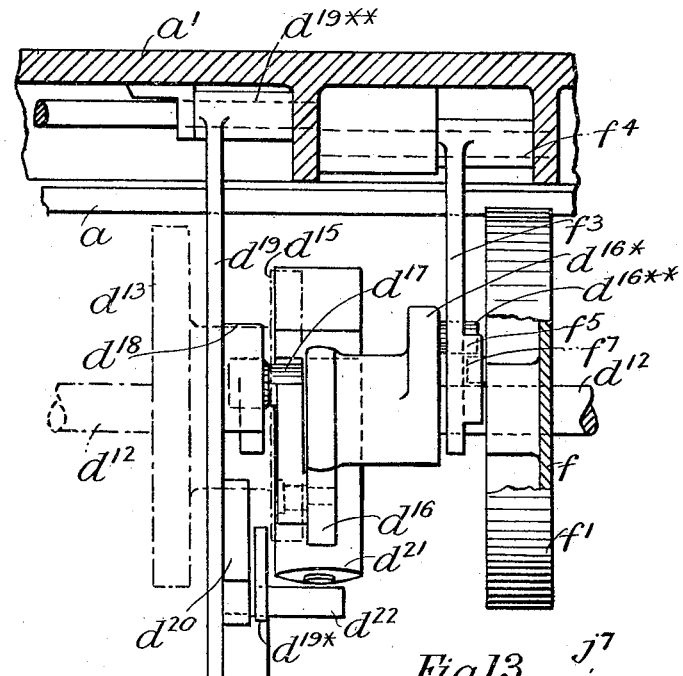
Fig. 12.  Fig. 13.
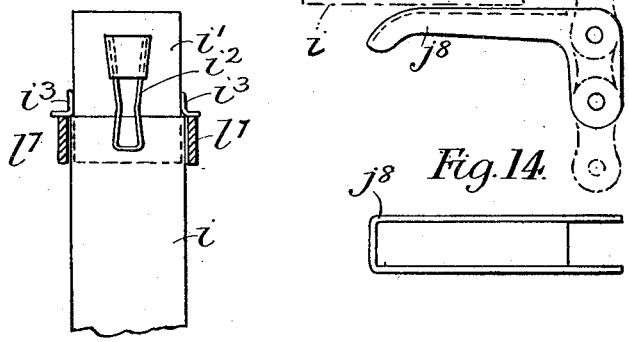
Fig. 14.
Witnesses:
J. W. Wynkoop.
D. H. Thornett.
Inventor
George Prokofiew,
By Knight Bros,
Attorneys G. PROKOFIEW.
AUTOMATIC MACHINE FOR PACKETING, WEIGHING, AND DELIVERING GIVEN QUANTITIES OF GRANULAR OR POWDERY MATERIAL.
APPLICATION FILED MAY 20, 1911.

1,137,284. Patented Apr. 27, 1915.
17 SHEETS—SHEET 9.

G. PROKOFIEW.
AUTOMATIC MACHINE FOR PACKETING, WEIGHING, AND DELIVERING GIVEN QUANTITIES OF GRANULAR OR POWDERY MATERIAL.
APPLICATION FILED MAY 20, 1911.
1,137,284.
Patented Apr. 27, 1915.
17 SHEETS—SHEET 10.
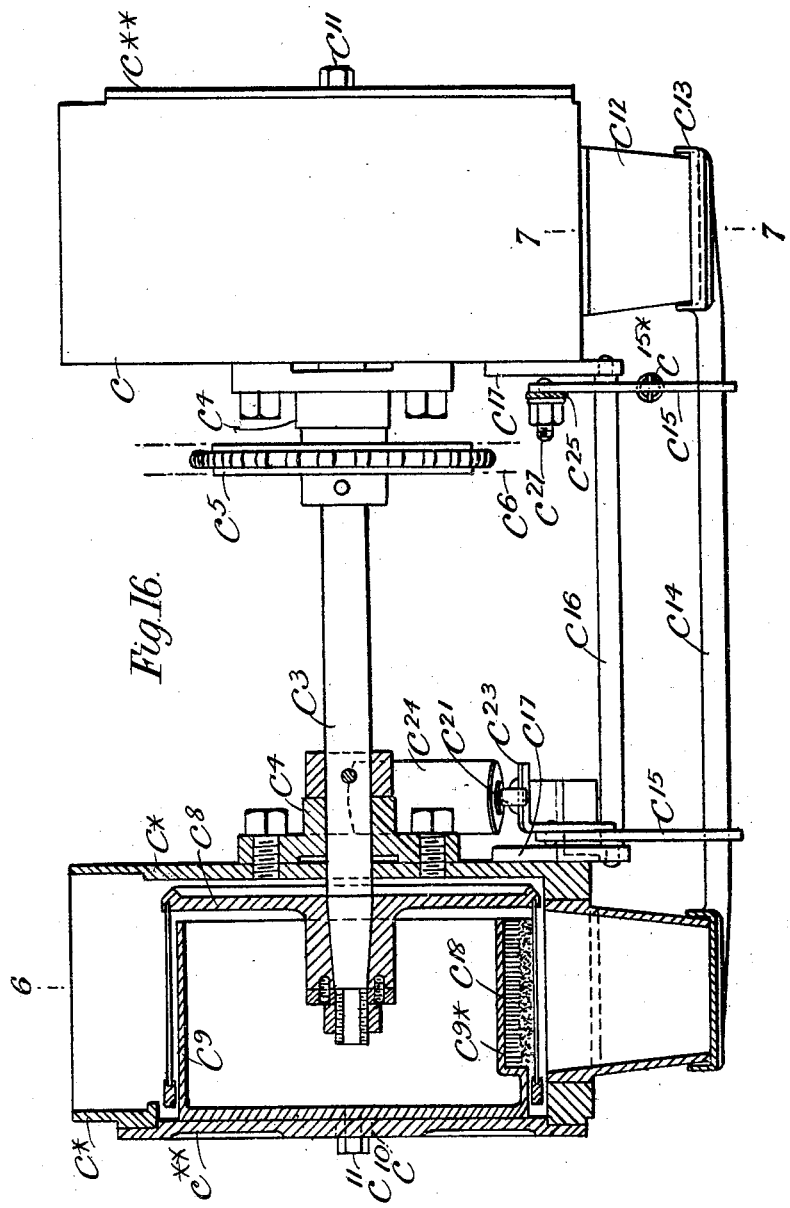

G. PROKOFIEW.
AUTOMATIC MACHINE FOR PACKETING, WEIGHING, AND DELIVERING GIVEN QUANTITIES OF GRANULAR OR POWDERY MATERIAL.
APPLICATION FILED MAY 20, 1911.
1,137,284.
Patented Apr. 27, 1915.
17 SHEETS—SHEET 11.
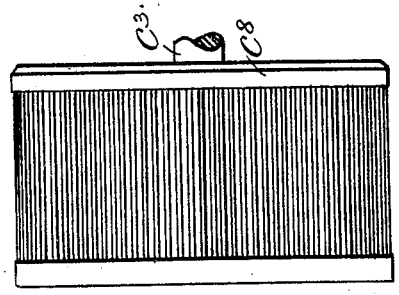
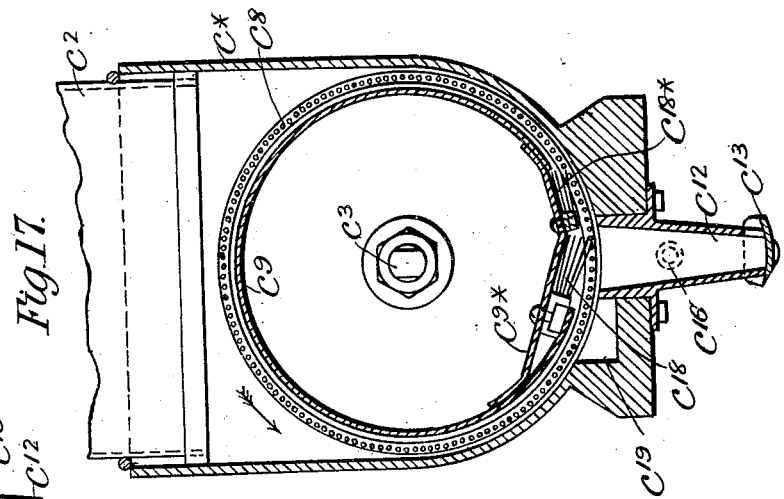
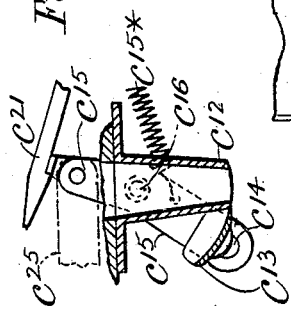

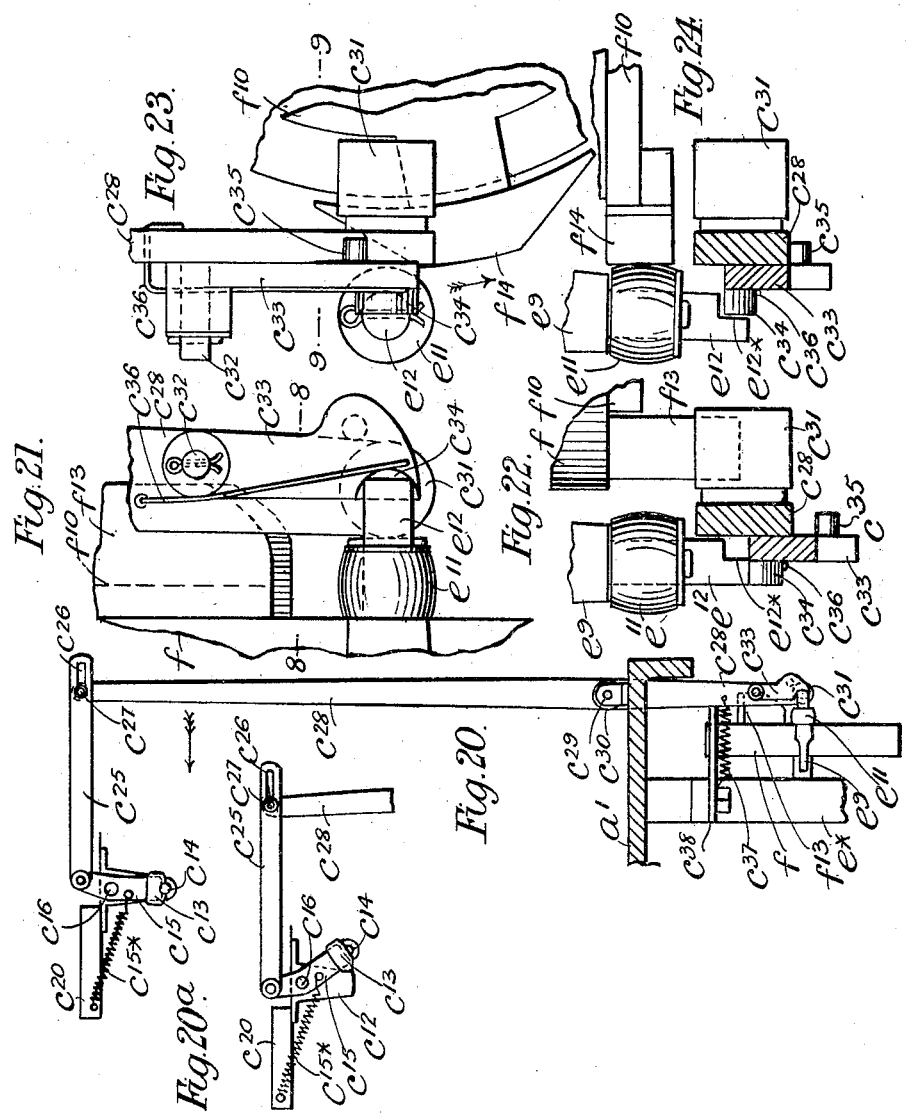

G. PROKOFIEW.
AUTOMATIC MACHINE FOR PACKETING, WEIGHING, AND DELIVERING GIVEN QUANTITIES OF GRANULAR OR POWDERY MATERIAL.
APPLICATION FILED MAY 20, 1911.
1,137,284.
Patented Apr. 27, 1915.
17 SHEETS—SHEET 13.
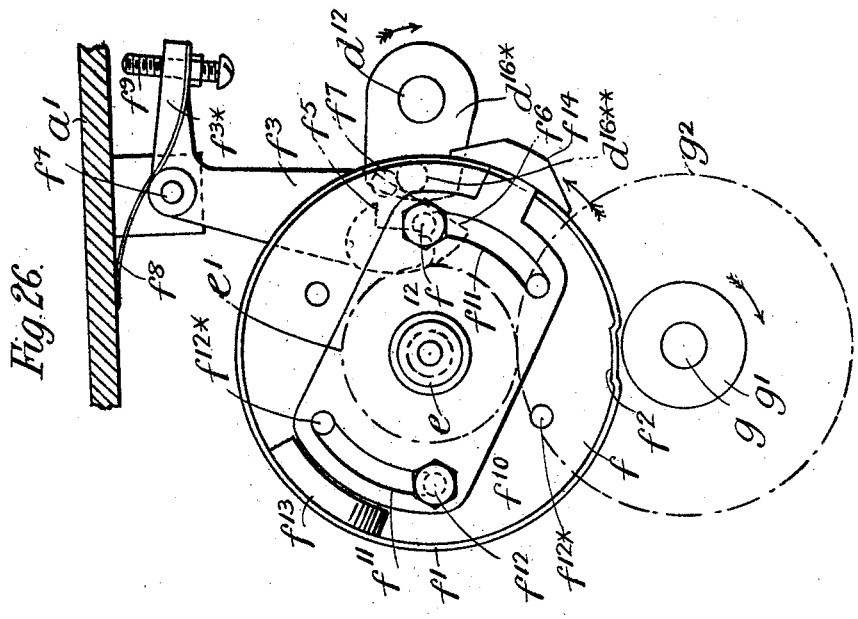
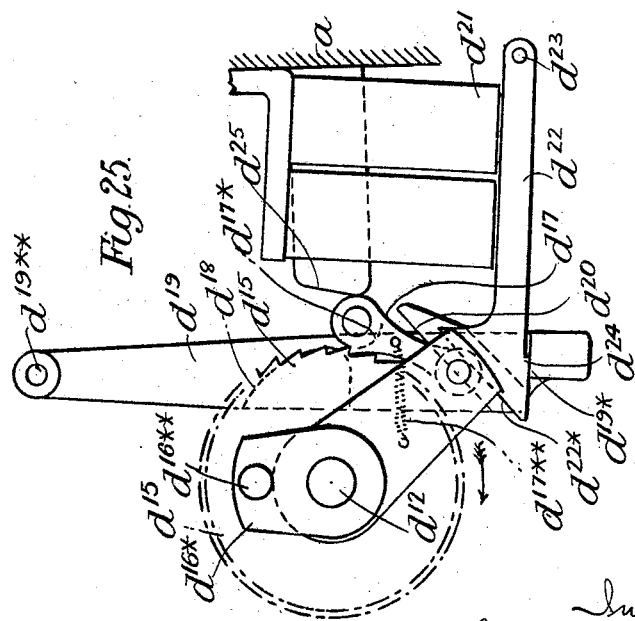

G. PROKOFIEW.
AUTOMATIC MACHINE FOR PACKETING, WEIGHING, AND DELIVERING GIVEN QUANTITIES OF GRANULAR OR POWDERY MATERIAL.
APPLICATION FILED MAY 20, 1911.
1,137,284.
Patented Apr. 27, 1915.
17 SHEETS—SHEET 14.
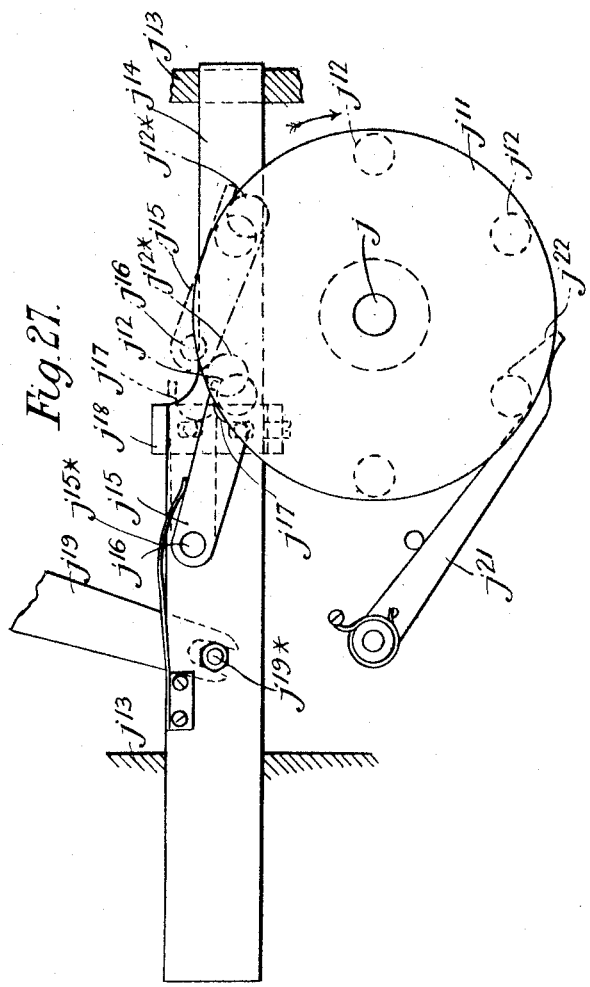

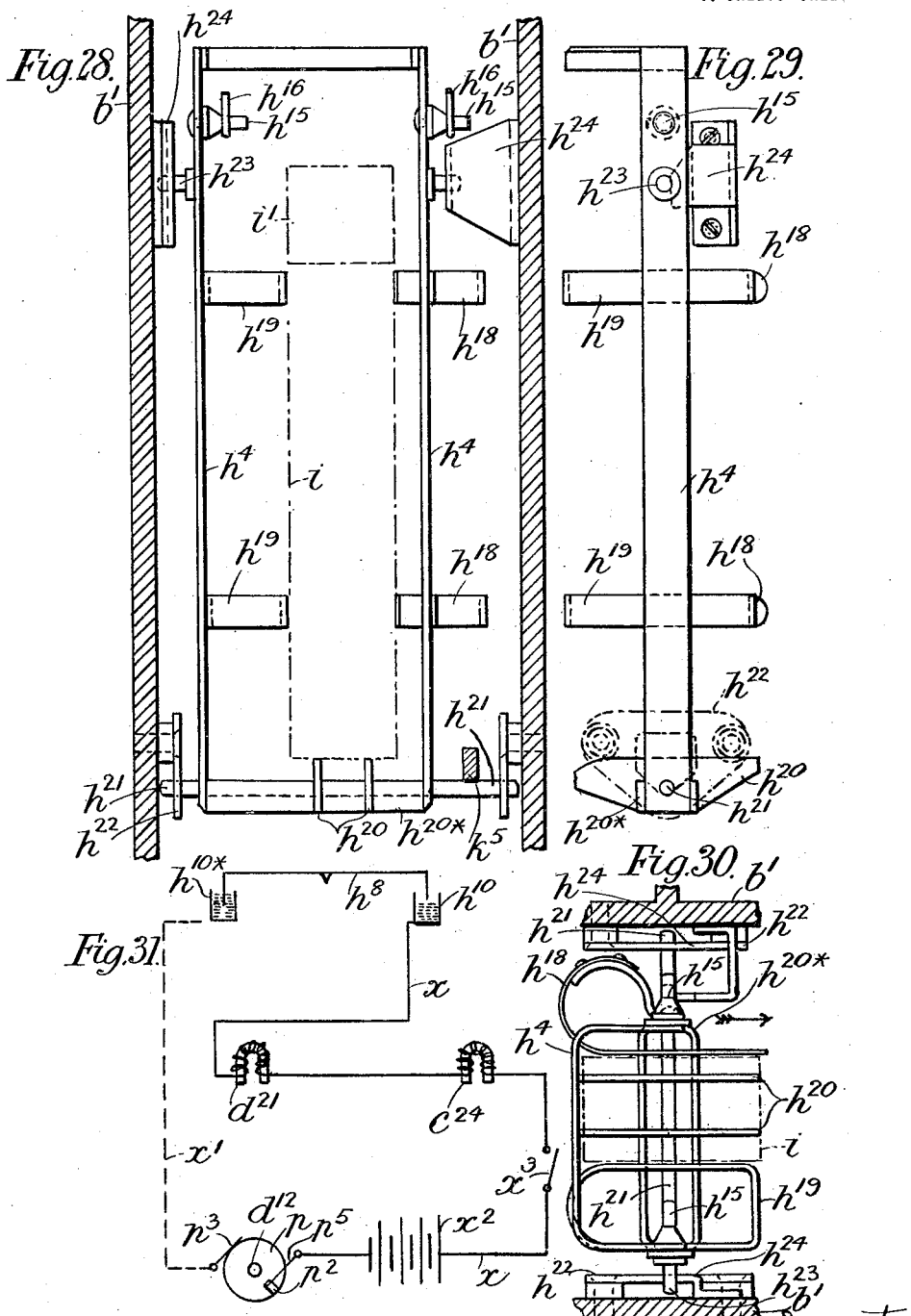

G. PROKOFIEW.
AUTOMATIC MACHINE FOR PACKETING, WEIGHING, AND DELIVERING GIVEN QUANTITIES OF GRANULAR OR POWDERY MATERIAL.
APPLICATION FILED MAY 20, 1911.
1,137,284.
Patented Apr. 27, 1915.
17 SHEETS—SHEET 16.
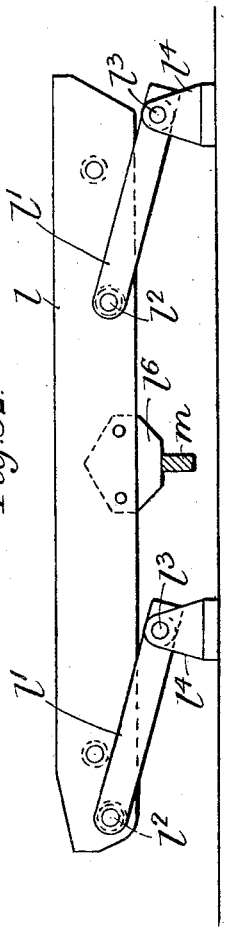
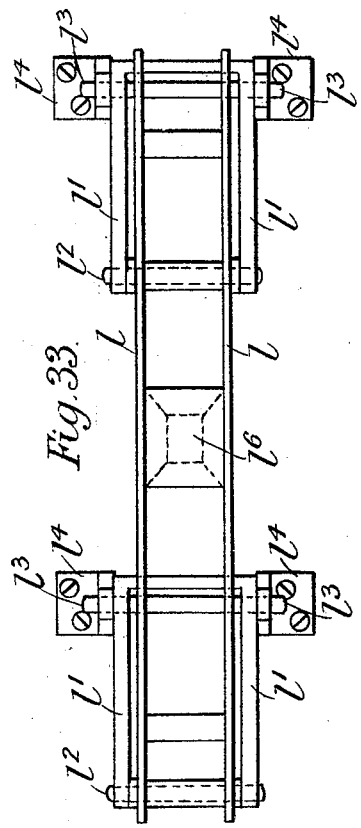

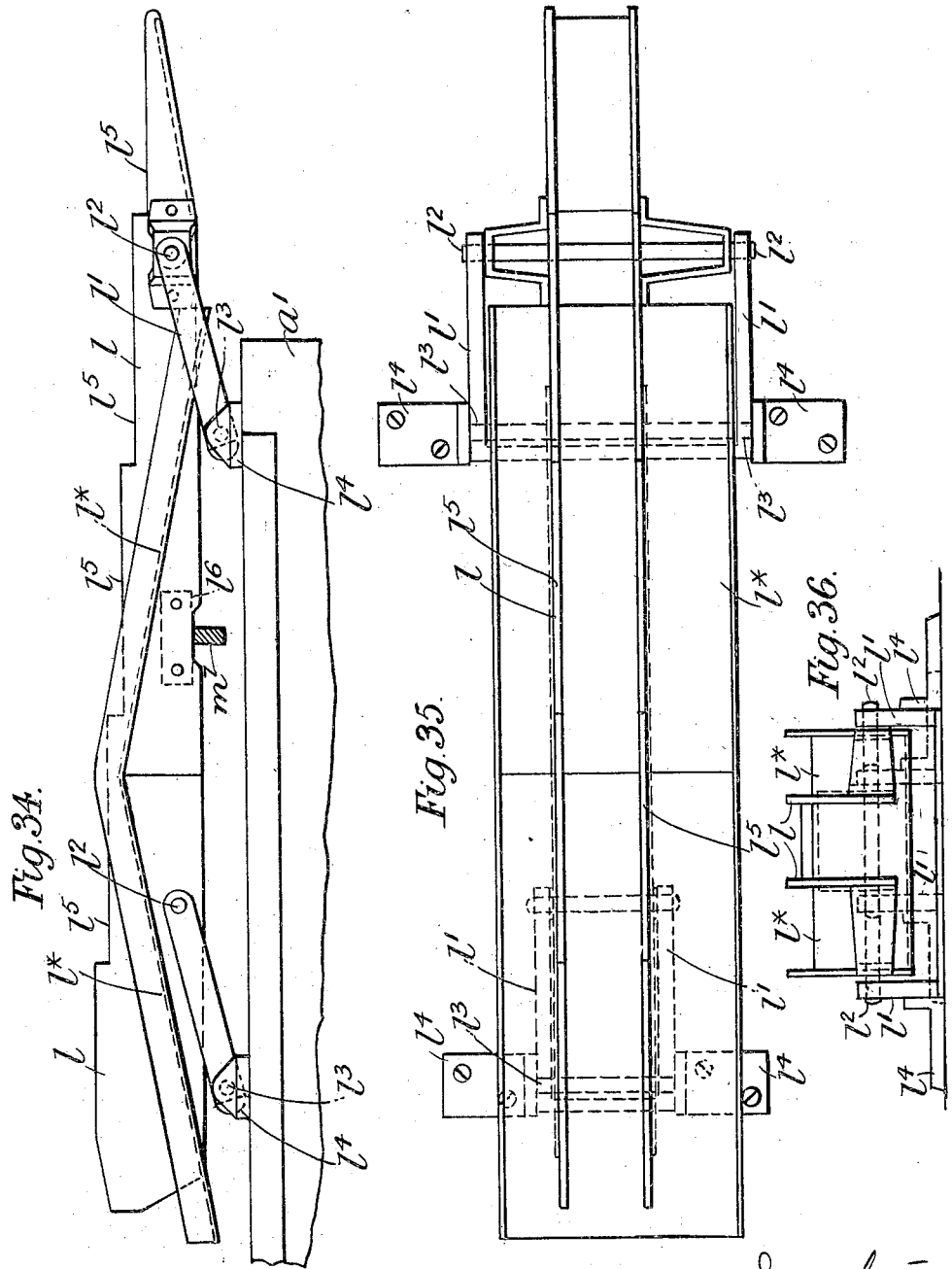

UNITED STATES PATENT OFFICE.

GEORGE PROKOFIEW, OF KENSAL RISE, LONDON, ENGLAND.

AUTOMATIC MACHINE FOR PACKETING, WEIGHING, AND DELIVERING GIVEN QUANTITIES OF GRANULAR OR POWDERY MATERIAL.

1,137,284.  Specification of Letters Patent.  Patented Apr. 27, 1915.

Application filed May 20, 1911. Serial No. 628,604.

*To all whom it may concern:*

Be it known that I, GEORGE PROKOFIEW, a subject of the King of Great Britain, residing at Vulcan Works, Ravensworth Road, Kensal Rise, in the county of London, England, engineer, have invented certain new and useful Improvements in or Connected with Automatic Machines for Packeting, Weighing, and Delivering Given Quantities of Granular or Powdery Material, of which the following is a specification, reference being had to the drawings hereunto annexed and to the figures and letters marked thereon—that is to say:

The invention relates to improvements in or connected with automatic machines for packeting, weighing and delivering given quantities of granular or powdery material.

The primary object of the present invention is to obtain an automatic machine more especially intended for dealing with material in the form of powder and which will accurately weigh into packets or receptacles given quantities thereof and deliver said filled packets ready for closing and that without any appreciable escape of dust from said material.

In the accompanying drawings:—Figure 1 is a front elevation of a machine constructed according to the present invention showing the parts in the position they assume at or approximately at the end of the weighing of a filled packet. Fig. 2 is an end elevation thereof. Fig. 3 is a horizontal section taken on the line 1—1 of Fig. 1 but with some parts removed, and showing the pawl controlling the feed disk disengaged from the coacting ratchet wheel. Fig. 4 is a detail plan view of the weighing beam, the mercury contact making device operated by the weighing beam and the weighing frame. Fig. 5 is a side elevation of Fig. 4 with parts broken away. Fig. 6 is a part transverse section taken on the line 2—2 of Fig. 4. Fig. 7 is part longitudinal section taken on the line 3—3 of Fig. 4 viewed from the rear of the machine. Fig. 8 is a side elevation of part of the machine opposite to that shown at Fig. 1. Fig. 8ª is a detail view of the means for driving the endless belt or conveyer. Fig. 9 is a similar view to Fig. 1 of part of the machine and illustrating a packet in the weighing frame ready to receive its charge and also the next following packet and several succeeding ones. Fig. 10 is a horizontal section taken on the line 4—4 of Fig. 9 with certain parts omitted. Fig. 10ª is a transverse section of the free wheel clutch viewed from the front of the machine; Fig. 11 is a sectional end view of the cam wheel and co-acting mechanism. Fig. 12 is an elevation of the upper part of a packet showing the upper guide rails in section. Fig. 13 is a plan of one of the fingers which traverse the packets. Fig. 14 is a side view thereof. Fig. 15 is an end elevation of one of the feed chambers and connected parts. Fig. 16 is a vertical section taken on the line 5—5 of Fig. 15 but showing the other chamber and connected parts in elevation. Fig. 17 is a vertical section taken on the line 6—6 of Fig. 16 looking from the feed end of the machine. Fig. 18 is a vertical section taken on the line 7—7 of Fig. 16 also showing the detent for retaining the shutter in its open position. Fig. 19 is an elevation of one of the rotary feed cages, drums or devices for regulating the flow of material through the feed chambers. Fig. 20 is an end elevation of the cam wheel and connected parts controlling the opening of the shutters of the feed chambers and showing the shutters in their closed position. Fig. 20ª is a similar view but showing the shutters in their open position. Fig. 21 is an end elevation of part of the cam wheel, lever co-acting cam on the cam wheel and connected parts for effecting said operation and indirectly bringing about the changing of the speed of the feed of material. Fig. 22 is a horizontal section taken on the line 8—8 of Fig. 21, but shown at right angles thereto. Fig. 23 is an elevation similar to Fig. 21 but taken at right angles thereto and showing an additional cam on the cam wheel for directly bringing about a second change in the speed of the feed. Fig. 24 is a horizontal section taken on the line 9—9 of Fig. 23. Fig. 25 is a side view of the mechanism for controlling the feed disk and showing the pawl engaged with the co-acting ratchet wheel. Fig. 26 is a side view of parts illustrating the means for bringing the cam wheel into gear with the roughened wheel. Fig. 27 is a detail view in plan of parts for giving motion to the chains for traversing the packets. Fig. 28 is an end elevation of the weighing frame and means for retaining the same in correct position, showing a packet in dotted lines. Fig. 29 is a side elevation of parts thereof. Fig. 30 is a plan thereof. Fig. 31 is a diagram of the mercury contact device and electrical connections. Fig. 32 is a side elevation of the first part of the vibratory platform. Fig. 33 is a plan thereof. Fig. 34 is a side elevation of the second part of the vibratory platform. Fig. 35 is a plan thereof and Fig. 36 is an end view of Fig. 34.

In the several figures like parts are indicated by similar letters of reference and Figs. 20 and 20$^a$ are drawn to an increased scale. Figs. 4 to 8$^a$ are drawn to a further increased scale. Figs. 9 to 12, 15 to 19, 25 to 30 and 32 to 36 are drawn to a further increased scale and Figs. 13, 14 and 21 to 24 are drawn to a further increased scale with respect to the other figures of the drawings.

$a$ represents the frame of the machine which supports a table $a'$ to which are bolted two standards $b\ b'$ and these standards have bolted to the upper part thereof cylindrical chambers $c^*\ c$ in which are arranged rotary cages or devices, hereinafter more fully referred to, for feeding and regulating the flow of the material and above one of these cylindrical chambers $c^*\ c$ is a feed hopper $c'$ leading by a bifurcated channel $c^2$ to the cylindrical chambers $c^*\ c$ and which latter may be called the feed chambers. (See Fig. 1.)

Extending between the feed chambers $c^*\ c$ and at its ends entering into each is a shaft $c^3$ which is supported in bearings $c^4$ bolted to the exterior of the chambers $c^*\ c$ and this shaft $c^3$ for the sake of distinction will be called the feed shaft. (See Fig. 1.)

Upon the feed shaft $c^3$ is fixed a chain wheel $c^5$ which by means of a chain $c^6$ is geared with a smaller chain wheel $d'$ loosely mounted upon a shaft $d$ revolubly mounted in bearings carried by brackets $d^*$ from the table $a'$ and which shaft $d$ may be called the feed clutch shaft and the chain $c^6$ passes around a jockey or guide pulley $c^7$. (See Figs. 1 and 2.)

The feed clutch shaft $d$ is constantly driven but at variable speeds by the means hereinafter described through chain and beveled gearing from a counter shaft all as hereinafter described and the chain wheel $d'$ has formed thereon a feed part clutch $d^2$ which at certain times is engaged by a coacting part clutch $d^3$ slidably mounted upon the feed clutch shaft $d$ but fixed therewith as regards rotation by a key or feather and groove in the well known manner and the slidable part clutch $d^3$ is intermittently thrown out of gear with the feed part clutch $d^2$ so as to leave its chain wheel $d'$ free upon the feed clutch shaft $d$ at the times desired. (See Fig. 3.)

The slidable part clutch $d^3$ is provided with an annular groove $d^4$ therein which is engaged by a stud $d^5$ upon one arm of a bell crank $d^6$ the other arm of which has pivotally connected thereto one end of a feed clutch rod $d^7$ which near to its other end is pivotally connected to a radius arm $d^8$ so that the rod $d^7$ is vertically movable and at its lower extremity the rod $d^7$ is provided with a truck or roller $d^9$ which rests and runs upon the periphery of a disk or wheel $d^{10}$ which may be called the feed disk. (See Fig. 3.)

The feed disk $d^{10}$ is provided with a depression $d^{11}$ in its periphery into which the truck or roller $d^9$ of the clutch rod $d^7$ is adapted to take so as to lower the rod $d^7$ and turn the bell crank $d^6$ upon its axis and thus throw the slidable part clutch $d^3$ into engagement with the feed part clutch $d^2$ at the times desired while when the truck or roller $d^9$ runs upon the other or cylindrical part of the periphery of the feed disk $d^{10}$ the slidable part clutch $d^3$ is by the lifting of the clutch rod $d^7$ disengaged from the feed part clutch $d^2$ and the feed is stopped a spring $d^{7*}$ being employed to throw the part clutch $d^3$ into gear and to keep the truck or roller $d^9$ on the feed disk $d^{10}$. (See Fig. 3.)

The feed disk is intermittently driven by the following means:—Said disk $d^{10}$ is fixed upon a shaft $d^{12}$ revolubly mounted in bearings carried by brackets $d^{12*}$ fixed to the table $a'$ and upon this shaft $d^{12}$ is loosely mounted a compound wheel consisting of a spur wheel $d^{13}$ and pinion $d^{14}$ and the spur wheel $d^{13}$ is constantly driven by a pinion $e^1$ normally loose upon a countershaft $e$ constantly driven but at variable speeds as hereinafter described by means of a chain wheel $e^2$ fixed with the pinion $e^1$ and a chain $e^3$ and a chain wheel $e^4$ fixed upon the main or first driven shaft $e^5$ which is provided with fast and loose pulleys $e^6$. (See Fig. 3.)

Fixed with the boss of the compound wheel $d^{13}\ d^{14}$ loose on the feed disk shaft $d^{12}$ is a ratchet wheel $d^{15}$ and fixed with said shaft is a crank $d^{16}$ having a spring actuated pawl $d^{17}$ which engages the ratchet wheel $d^{15}$ at certain times, that is when the feed is to be stopped, and rotates the feed disk shaft $d^{12}$ and feed disk $d^{10}$ but at other times the pawl $d^{17}$ is disengaged from the ratchet wheel $d^{15}$ by means of a cam $d^{18}$ upon a swinging bar $d^{19}$ mounted upon an axis of motion $d^{19**}$ which cam $d^{18}$ is, by means of a cam or incline $d^{20}$ on the lower end of the swinging bar $d^{19}$ brought into the path of an offset $d^{17*}$ from the pawl $d^{17}$ which latter is lifted out of gear with the ratchet wheel $d^{15}$ when the feed is required to start and the truck or roller $d^9$ of the movable feed clutch rod $d^7$ at the same time enters the notch or depression $d^{11}$ in the feed disk $d^{10}$ thereby allowing the rod $d^7$ to fall, and throwing the feed part clutch $d^3$ into engagement with the feed part clutch $d^2$ and thus through the chain wheel $d'$ and chain $c^6$ giving motion to the feed regulating devices or cages hereinafter more fully referred to. (See Fig. 3.)

The swinging bar $d^{19}$ is held with its cam $d^{18}$ in the path of the offset $d^{17*}$ of the pawl $d^{17}$ and is subsequently released, to allow the pawl $d^{17}$ to engage the ratchet wheel $d^{15}$, by the following means:—Mounted upon the frame $a$ of the machine is an electromagnet $d^{21}$ placed in circuit with a battery $x^2$ and provided with a horizontal armature $d^{22}$ pivoted at $d^{23}$ to the frame $a$ and this armature $d^{22}$ is formed with a downwardly projecting tooth, catch or detent $d^{24}$ and in the revolution of the crank $d^{16}$ the offset or roller $d^{17*}$ of the pawl $d^{17}$ engages the cam or incline $d^{20}$ upon the swinging bar $d^{19}$ bringing a projection $d^{19*}$ into engagement with the tooth or detent $d^{24}$ of the armature $d^{22}$ thus holding the cam $d^{18}$ of the swinging bar $d^{19}$ in the path of the offest $d^{17*}$ of the pawl $d^{17}$ so that in the continued revolution of the crank $d^{16}$ the offset $d^{17*}$ of the pawl $d^{17}$ will engage the cam $d^{18}$ and thereby be held out of engagement with the ratchet wheel $d^{15}$ until the magnet $d^{21}$ is energized and the armature $d^{22}$ is consequently attracted and the detent $d^{24}$ tripped or withdrawn from engagement with the projection $d^{19*}$ upon the swinging bar $d^{19}$ when the swinging bar $d^{19}$ is allowed to resume its normal position by gravity and the pawl $d^{17}$ under the influence of its spring $d^{17**}$ and the pressure of the pawl $d^{17}$ upon the cam $d^{18}$ assists to restore the swinging bar $d^{19}$ to its normal position. (See Figs. 3 and 9.)

In order to prevent the pawl $d^{17}$ on its first engagement with the cam $d^{18}$ in the revolution of the crank $d^{16}$ being thrown off the cam by centrifugal action; in which case it might travel beyond the cam $d^{18}$ and reëngage the ratchet wheel $d^{15}$ and so miss one operation, an incline $d^{25}$ is provided carried by the frame $a$ and engages the offset $d^{17*}$ of the pawl $d^{17}$ and prevents that irregular action. (See Figs. 9 and 25.)

In case, on the breaking of the circuit, the armature $d^{22}$ should still be sufficiently attracted by the magnet $d^{21}$ to hold the detent tooth $d^{24}$ in its out of engagement position an inclined projection $d^{22*}$ is provided upon the armature $d^{22}$ which is engaged by the offset $d^{17*}$ of the pawl $d^{17}$ of the crank $d^{16}$ in its revolution. (See Figs. 9 and 25.)

At a certain period, that is after the weighing operation hereinafter described, is about completed the electric circuit is closed by the same contact making device which controls the cut off shutters of the feed chambers $c^*c$ and which shutters are hereinafter described, so that the shutters are closed at the same time that the magnet $d^{21}$ attracts the armature $d^{22}$ and releases the swinging bar $d^{19}$ permitting the spring $d^{17**}$ of the pawl $d^{17}$ to assert itself and cause the pawl $d^{17}$ to again engage the ratchet wheel $d^{15}$ and stop the action of the feed clutch shaft $d$ and therefore the feed as hereinbefore explained. (See Fig. 9.)

In the next revolution of the crank $d^{16}$ the offset $d^{17*}$ of the pawl $d^{17}$ engages the cam or incline $d^{20}$ on the swinging bar $d^{19}$ and again throws the cam $d^{18}$ into the path of the offset $d^{17*}$ of the pawl $d^{17}$ and the projection of $d^{19*}$ of the swinging bar $d^{19}$ into engagement with the detent $d^{24}$ of the armature $d^{22}$ and the hereinbefore described operations are repeated. (See Fig. 9.)

The pinion $e'$ upon the counter shaft $e$ which meshes with and drives the spur wheel $d^{13}$ of the compound wheel $d^{13}$ $d^{14}$ of the feed disk shaft $d^{12}$ has fixed therewith a chain wheel $e^2$ which as hereinbefore described, is geared with the first or main shaft $e^5$ and the pinion $e'$ also has fixed therewith a part clutch $e^{1*}$ and the chain wheel $e^2$ pinion $e'$ and the part clutch $e^{1*}$ are all fixed or formed together and loose upon the counter shaft $e$. (See Figs. 3 and 9.)

Slidable upon the counter shaft $e$ is a coacting part clutch $e^{1}$ which is fixed with the shaft $e$ as regards rotation by means of a feather $e^{}$ and the part clutch $e^{1**}$ is provided with an annular groove $e^7$ which is engaged by a roller $e^8$ carried by a stud upon the forked arm of a bell crank lever $e^9$ mounted upon an axis of motion $e^{10}$ and the other arm of which bell crank is provided with a track or roller $e^{11}$ which at certain times is acted upon by a cam $f^{14}$ upon a cam wheel $f$ loose upon the counter shaft $e$. (See Figs. 1, 2 and 10.)

The cam wheel $f$ is provided with a peripheral covering of leather $f'$ or the like which is engaged by a roughened wheel $g'$ fixed upon a lower shaft $g$ which has fixed thereon a spur wheel $g^2$ which meshes with the pinion $e'$ of the counter shaft $e$ by which means the lower shaft $g$ is constantly driven at a given speed. (See Figs. 1 and 9.) The cam wheel $f$ however is not constantly driven by the lower shaft $g$ but is intermittently rotated thereby by the following means:—At a given point in its circumference the periphery $f'$ of the leather covered cam wheel $f$ is formed with a depression or dwell $f^2$ so that when that part comes opposite the roughened wheel $g'$ of the lower shaft $g$ the rotation of the cam wheel $f$ ceases and it remains stationary while the slow feed which has previously commenced is continued that is to say that part of the feed of material to the packet $i$ on the weighing frame $h^4$ which takes place immediately before the required weighing is reached. (See Figs. 1 to 9.) The cam wheel $f$ is held in this position by an arm $f^3$ pivotally mounted at $f^4$ and provided with a hook like detent $f^5$ which at certain times engages a pin $f^7$ upon the cam wheel $f$ and the detent $f^5$ is thus held by means of a spring $f^8$ which acts upon an offset $f^{3*}$ from the arm $f^3$ and the outward motion of the offset $f^{3*}$ is limited by an adjustable stop $f^9$ carried by the arm $f^3$ and which stop $f^9$ abuts against the table $a'$. (See Figs. 1 and 9.)

On the lower end of the arm $f^3$ is an incline $f^6$ and fixed on the shaft $d^{12}$ adjacent to the crank $d^{16}$ is another crank $d^{16*}$ provided near its extremity with a pin $d^{16**}$ and at a given time, that is when the quick feed is again required, the detent $f^5$ is withdrawn from the pin $f^7$ (it is shown just withdrawn in Fig. 26), in the rotation of the crank $d^{16*}$ by the pin $d^{16**}$ which comes against the incline $f^6$ upon the arm $f^3$ and throws the detent $f^5$ clear of the pin $f^7$ and in the continued rotation of the crank $d^{16*}$ the pin $d^{16**}$ engages the pin $f^7$ upon the cam wheel $f$ and gives a partial rotation thereto thus again throwing it into gear with the roughened wheel $g'$ on the lower shaft $g$. (See Fig. 9.)

Upon the face of the cam wheel $f$ is a slotted plate $f^{10}$ revolubly mounted upon the shaft $e$ and provided with concentric slots $f^{11}$ through which pass headed studs $f^{12}$ screwing into two of a circle of tapped holes $f^{12*}$ in the cam wheel $f$. (See Fig. 9.)

On the cam wheel $f$ is fixed a cam $f^{13}$ which relates to the quick or rough feed and fixed upon the plate $f^{10}$ is a cam $f^{14}$ which relates to the slow or finishing feed and which cam $f^{14}$ may, by adjusting the plate $f^{10}$ within the range of the slots $f^{11}$, be adjusted to slightly vary the relative periods of the slow and quick feeds while by shifting the studs $f^{12}$ into others of the tapped holes $f^{12*}$ a very wide adjustment in this respect may be obtained. (See Figs. 1 to 9.)

The cam $f^{13}$ at each revolution of the cam wheel $f$ throws the slidable part clutch $e^{1**}$ of the counter shaft $e$ into engagement with the part clutch $e^{1*}$ thus bringing about the quick or initial feed while the cam $f^{14}$ at each revolution throws the part clutch $e^{1**}$ out of engagement with the part clutch $e^{1*}$ and thus brings about the slow or final feed as hereinafter more fully described. (See Figs. 1 to 9.)

The feed clutch shaft $d$ is constantly driven by a chain wheel $e^{13}$ fixed upon the countershaft $e$, a chain $e^{14}$ another chain wheel $e^{15}$ upon a short shaft $e^{16}$ carried by a bracket $e^{17}$ upon the table $a'$ and miter gearing $e^{18}$ but a differential speed is given to the counter shaft $e$ and consequently to the feed clutch shaft $d$ when the cam $f^{14}$ of the cam wheel $f$ has thrown the part clutch $e^{1**}$ of the counter shaft $e$ out of gear, by the following means:—(See Figs. 1 to 9 and 26.)

Loose upon the counter shaft $e$ is a spur wheel $e^{19}$ which however is connected with said shaft $e$ by a free wheel clutch $e^{20}$ and this spur wheel $e^{19}$ meshes with the pinion $d^{14}$ of the compound wheel $d^{13}$ $d^{14}$ upon the feed disk shaft $d^{12}$ so that when the part clutch $e^{1}$ of the countershaft $e$ is out of gear as shown at Fig. 10 the countershaft $e$ is driven by the chain wheel $e^2$ the pinion $e'$ spur wheel $d^{13}$ spur pinion $d^{14}$ spur wheel $e^{19}$ and free wheel clutch $e^{20}$ at a reduced speed. (See Figs. 1, 2, 3, 8 and 10.) At other times, however, when the part clutch $e^{1}$ is in engagement with the part clutch $e^{1*}$ the chain wheel $e^2$ and spur pinion $e^1$ being thus fixed with the counter shaft $e$ the drive is direct through the shaft $e$ and therefore the speed is higher. (See Fig. 10.)

Fixed upon the ends of the feed shaft $c^3$ within the feed chambers $c^*$ $c$ are cylindrical drums or cages $c^8$ the peripheries of which are composed of closely spaced bars or rods, and these cage like drums are of slightly smaller diameter than the interior of the feed chambers $c^*$ $c$. (See Figs. 1 and 2.)

Within each of the cage like drums $c^8$ which are rotated by the feed shaft $c^3$, is arranged an imperforate cylinder $c^9$ of slightly small diameter than the cage like drums $c^8$ and these imperforate cylinders $c^9$ are fixed with the covers $c^{**}$ of the feed chambers $c^*$ $c$ so that they are not rotated. (See Figs. 1 and 2.)

At the lower part of each of the feed chambers $c^*$ $c$ is an opening and fixed on the outside of each of the feed chambers $c^*$ $c$ coincident with the opening is a delivery spout $c^{12}$ which is controlled by a swinging shutter $c^{13}$ and the two shutters $c^{13}$ are fixed upon a bar $c^{14}$ carried by the lower ends of rocking arms $c^{15}$ suspended from a bar $c^{16}$ at its ends revolubly mounted in brackets $c^{11}$ fixed with the feed chambers $c^*$ $c$ so that they act in unison. (See Figs. 1, 15 and 21.)

Each of the imperforate fixed cylinders $c^9$ of the feed chambers $c^*$ $c$ is provided, adjacent to the opening at the bottom of the feed chambers $c^*$ $c$ with one, or as shown preferably two, brushes $c^{18}$ $c^{18*}$ and these brushes are mounted in a recess $c^{9*}$ formed in the imperforate cylinder $c^9$. (See Figs. 1, 15, 16, 17 and 21.)

The one, $c^{18}$, of the brushes is arranged about opposite to or across the opening leading into the delivery spout $c^{12}$ and its office is to direct the powdery material into said spout $c^{12}$ and the other brush $c^{18*}$ is arranged slightly beyond said opening and serves to prevent the material, descending from the hopper $c'$ around the imperforate cylinder $c^9$ passing beyond the opening leading to the delivery spout $c^{12}$. (See Figs. 1 and 16.)

In order to adjust the position of the brushes $c^{18}$ $c^{18*}$ with relation to the opening in the feed chamber $c^*$ or $c$ leading to the delivery spout $c^{12}$ the cover $c^{**}$ of the feed chamber $c^*$ or $c$ is provided with short concentric slots $c^{10}$ through which pass nut headed studs $c^{11}$ which screw into tapped holes in the imperforate cylinder $c^9$ so that by slacking the studs $c^{11}$ the imperforate cylinder $c^9$ may be partially rotated and thus the position of the brushes $c^{18}$ $c^{18*}$ may be varied. (See Figs. 1, 16 and 17.)

A well $c^{19}$ is provided at the lower part of each of the chambers $c^*$ $c$ at one side of the delivery spout $c^{12}$ and serves as a trap to collect any foreign matter that may pass into the feed chambers $c^*$ $c$ from the hopper $c'$. (See Figs. 1, 2 and 16.)

The powdery material from the hopper $c'$ flows into the feed chambers $c^*$ $c$ and into the cage like drums $c^8$ through the bars thereof and on to the imperforate cylinders $c^9$ and in their rotation the cage like drums $c^8$ carry forward and regulate the delivery of the powder through the delivery spouts $c^{12}$ of the feed chambers $c^*$ $c$ and by means of the feed clutch $d^2$ $d^3$ on the feed clutch shaft $d$ the rotation of these cage like feed drums $c^8$ is arrested at about the moment that the filling and weighing of a packet are completed as hereinafter described. (See Figs. 3 to 17.)

The cut off shutters $c^{13}$ of the delivery spout $c^{12}$ are closed by a spring $c^{15*}$ at one end attached to one of the supporting arms $c^{15}$ and by the other end attached to a projection $c^{20}$ from the feed chamber $c$ and the shutters $c^{13}$ are restored to their open position, which is indicated at Fig. 18, by the means hereinafter described which turn the arms $c^{15}$ on their axes $c^{16}$ into a position to engage a detent $c^{21}$ carried by a spring $c^{22}$ fixed upon the chamber $c^*$ and which spring $c^{22}$ constantly tends to force the detent $c^{21}$ into a position to engage the cranked upper end $c^{23}$ of one of the arms $c^{15}$ and thus hold the shutters $c^{13}$ in their open position. (See Figs. 15 to 25.)

The shutters $c^{13}$ are thus by the detent $c^{21}$ held in their open position but at required times, that is, when the feed is to be stopped the detent $c^{21}$ is tripped and the spring $c^{15*}$ is allowed to assert itself and through the arm $c^{15}$ close the shutters $c^{13}$.

The means for tripping the detent $c^{21}$ consist of an electro magnet $c^{24}$ placed in an electric circuit hereinafter referred to and to which magnet $c^{24}$ the detent $c^{21}$ serves as an armature so that when the magnet $c^{24}$ is energized upon the closing of the circuit by the depression of the weighing beam as hereinafter described the detent $c^{21}$ is tripped or retracted. (See Fig. 15.)

The means for restoring the shutters $c^{13}$ to their open position are as follows:—Pivotally connected with the upper end of one of the arms $c^{15}$ is a link $c^{25}$ the opposite end of which is provided with a long slot $c^{26}$ which by means of a pin $c^{27}$ is loosely connected with the upper end of a long arm or lever $c^{28}$ pivotally mounted near to its lower end upon an axis $c^{29}$ carried by lugs $c^{30}$ fixed with the table $a'$ and at that point the lever $c^{28}$ is cranked and formed tubular at $c^{28*}$. (See Figs. 16, 20, and 20$^a$.)

At its lower end which extends below the table $a'$ the long arm or lever $c^{28}$ is provided with a truck or roller $c^{31}$ which is acted upon by the cam $f^{13}$ upon the camwheel $f$ to open the shutters $c^{13}$ by turning the long arm or lever $c^{28}$ upon its axis $c^{29}$ in the direction of the arrow Fig. 20 and at the same time the cam $f^{13}$ moves the lever $c^{28}$ into a position relatively to the end $e^{12}$ of the bell crank $e^9$ to enable the latter to move inward under the influence of its spring $e^{9*}$ to operate the part clutch $e^{1**}$ to bring about the high speed. (See Figs. 20 and 20$^a$.)

In the end $e^{12}$ of the bell crank $e^9$ is a notch $e^{12*}$ and pivotally mounted at $c^{32}$ upon the arm or lever $c^{28}$ is a latch or stop $c^{33}$ provided on one side with a lump $c^{34}$ adapted to take into the notch $e^{12*}$ of the bell crank lever $e^9$ and also provided with a pin or stop $c^{35}$ adapted to engage the edge of the arm or lever $c^{28}$ and the latch or stop $c^{33}$ is acted upon by a spring $c^{36}$ which engages the lump $c^{34}$ and tends to move the latch or stop $c^{33}$ on its axis $c^{32}$ into the notch $e^{12*}$ of the bell crank lever $e^9$. (See Figs. 21 and 22.)

In the normal position of the parts that is when the slow feed is in action the lump $c^{34}$ enters into the notch $e^{12*}$ of the bell crank $e^9$ as shown in Fig. 24 but when the cam $f^{13}$ acts upon the truck or roller $c^{31}$ to turn the lever $c^{28}$ upon its axis $c^{29}$ in the direction of the arrow so as to open the shutters $c^{13}$ the lump $c^{34}$ on the latch $c^{33}$ is carried beyond the end $e^{12}$ of the bell crank lever $e^9$ and the latter swings into the position shown in Fig. 22 with the lump $c^{34}$ abutting against the end $e^{12}$ of the bell crank $e^9$ thus bringing the part clutch $e^{1**}$ into engagement with the part clutch $e^{1*}$ and consequently bringing about the accelerated rotation of the counter shaft $e$ and therefore the quick feed. (See Figs. 21 to 24.) In this position of the parts when the cam $f^{13}$ has passed the truck or roller $c^{31}$ of the lever $c^{28}$ and thereby traversed the lever $c^{28}$ so as to open the shutter $c^{13}$ as shown at Fig. 20$^a$ said lever under the influence of a spring $c^{37}$ swings in the opposite direction of the arrows Fig. 20 until arrested by a stop $c^{38}$ carried by a bracket $e^*$ thus causing the lower end of the lever $c^{28}$ to approach the face of the cam wheel $f$ in readiness for the next operation and at the same time traversing the stud $c^{27}$ to the end of the slot $c^{26}$ in the link $c^{25}$ so as to enable the shutters $c^{13}$ to close under the influence of the spring $c^{15*}$.

The stop or pin $c^{35}$ upon the latch $c^{33}$ at the lower end of the lever $c^{28}$ and which stop or pin rests against the said lever causes the lever $c^{28}$ and the latch or stop $c^{33}$ to move together when the roller $c^{31}$ is acted upon by the cam $f^{13}$ and thus causes the lump $c^{34}$ upon the latch or stop $c^{33}$ to be carried beyond the end $e^{12}$ of the bell crank lever $e^9$ leaving the latter free to move inward. (See Figs. 23 to 27.)

The office of the cam $f^{14}$ is to act upon the truck or roller $e^{11}$ of the bell crank $e^9$ in the revolution of the cam wheel $f$ and thus to turn the bell crank lever $e^9$ upon its axis so as to disengage the clutch $e^{1**}$ $e^{1*}$ as shown at Fig. 10 ready for the operation hereinbefore described.

The scales consist of a weighing beam $h$ fixed upon a shaft $h'$ provided with knife edged bearings $h^2$ carried by a standard $h^{2*}$ bolted to the table $a'$ and said beam $h$ is at one end provided with suspended weights $h^3$ and at the other end it is provided with a frame $h^4$ hereinafter called the weighing frame in which the packet $i$ to receive the powder from the delivery spouts $c^{12}$ rests, and to and from which it is conveyed in the manner hereinafter described. (See Figs. 23 to 27.)

Carried by the scale beam $h$ axially of but beyond one of its bearings $h^2$ is a downwardly directed crank $h^5$ which extends into an oil box $h^6$ carried by a platform $h^7$ and fixed to the upper part of the crank $h^5$ is a beam $h^8$ extending longitudinally of the platform $h^7$ and at its extremities this beam $h^8$ is provided with downwardly directed contact points $h^9$ $h^{9*}$ which are adapted to dip into mercury cups $h^{10}$ $h^{10*}$ carried by the platform $h^7$ and that one $h^{9*}$ of the contact points which dips into the mercury cup $h^{10*}$ is constantly immersed in the mercury of the cup and which mercury is placed in an electric circuit through the frame of the machine and is more fully referred to later on. (See Figs. 27 to 31.) The other mercury cup $h^{10}$ is by a block of nonconducting material $h^{11}$ insulated from the platform $h^7$ and is by a conductor $x$ placed in the electric circuit with the electro-magnet $d^{21}$ controlling the swinging bar $d^{19}$ and also with the electro-magnet $c^{24}$ controlling the shutters $c^{13}$ so that upon the completion of the circuit by the depression of the weighing beam $h$ under the influence of the filled packet $i$ in the weighing frame $h^4$ and the consequent immersion of the contact points $h^9$ $h^{9*}$ in the mercury of the cups $h^{10}$ $h^{10*}$ the motion of the cage like feed drums $c^8$ and therefore the feed will be stopped and the shutters $c^{13}$ closed by the tripping of the detent $c^{21}$. (See Figs. 28 to 31.)

The contact making device carried by the platform $h^7$ is provided with a deep cover $h^{12}$ which closely fits upon the plate $h^7$ and prevents dust getting to the contacts $h^9$, $h^{9*}$, and as an additional security the cover $h^{12}$ is provided with a downwardly directed partition $h^{13}$ which extends across the interior of the oil box $h^6$ and into the oil therein and thus lessens the risk of dust passing around the crank shaft $h^1$ under the cover $h^{12}$ and thus to the contacts. (See Figs. 5 and 7.)

The bottom of the insulated mercury cup $h^{10}$ is formed by a stud $h^{14}$ screwing thereinto so that the level of the mercury in the cup $h^{10}$ may be regulated at will. (See Fig. 7.)

The weighing frame $h^4$ in which the packet $i$ is held during the filling and weighing operations is of skeleton form and is suspended from the scale beam $h$ by means of studs $h^{15}$ on the weighing frame $h^4$ to which are pivotally connected links $h^{16}$ which in turn are pivotally connected to frames or stirrups $h^{17}$ which embrace the weighing beam $h$ and rest upon knife edged centers carried by the beam $h$. (See Figs. 5, 7, 28 and 29.)

The weighing frame is open at the front and back that is in the direction of travel of the packet $i$ as shown by the arrow in Fig. 30 and the packet is held in the weighing frame $h^4$ during the filling and weighing operation by spring tongues $h^{18}$ which however are of a flexible character and permit it to be carried through and beyond the weighing frame $h^4$ as hereinafter described. (See Figs. 4 and 30.)

At the side of the weighing frame $h^4$ opposite the spring tongues $h^{18}$ are guide frames $h^{19}$ which, in conjunction with the spring tongues $h^{18}$ assist to position the packet $i$ with relation to the delivery spout $c^{12}$ from the feed chamber $c$ while the packet $i$ at its lower end rests upon supports $h^{20}$ carried by bars $h^{20*}$. (See Figs. 1 and 4.)

The vertical movement of the weighing frame $h^4$ is limited by stops consisting of slotted plates $h^{22}$ fixed with the standards $b^1$ and an extension of the pin $h^{21}$ which engages said slots and the lower part of the slots is formed of V shape so as to centralize the frame $h^4$ in its lowest position. (See Fig. 4.)

The forward motion of the frame $h^4$ under the influence of the packet $i$ being carried thereunto and beyond it by the chain conveyers $j^7$ hereinafter described is prevented by means of studs $h^{23}$ upon weighing frame $h^4$ which engage inclined stops or guides $h^{24}$ carired by the standards $b^1$. The packets $i$ are carried beneath the feed spouts $c^{12}$ of the feed chambers $c^*$ $c$ and into and beyond the weighing frame $h^4$ by the following means:—Beyond one end of the table $a^1$ of the machine is a vertical shaft $j$ revolubly mounted in bearings $j^2$ carried by a bracket $j^1$ fixed to the table $a^1$ and upon this shaft $j$ are fixed two suitably distanced driven chain wheels $j^3$ and at the other end of the table $a^1$ are two corresponding but idle chain wheels $j^6$ which are revolubly mounted by means of ball bearings upon vertical pins $j^5$ supported in the arms of a bifurcated bracket $j^4$ bolted to the table $a^1$ and at this point the inner guide rails $j^9$ are cut away and the chain conveyers hereinafter referred to pass around the chain wheels $j^6$ which wheels and chains form the necessary guides for the packets $i$.

Upon the two sets of chain wheels $j^3$ and $j^6$ are mounted endless chains or conveyers $j^7$ which at suitable intervals are provided with outwardly projecting horizontal fingers $j^8$ between which the packets $i$ are placed by the operator corresponding upper and lower guide rails $j^9$ supported upon brackets $j^{9}$ from the frame $a$ being provided to laterally support and guide the packets $i$ while a central lower rail $j^{10}$ is employed which is supported by brackets $j^{9*}$ from the table $a^1$ and from the brackets $j^{9*}$ respectively upon which central rail the packets $i$ rest but this latter rail terminates short of the guide rails $j^9$ at which point the packets $i$ are transferred to a platform hereinafter described. (See Figs. 1, 2, 32, 33, 34 and 35.)

The outer one of the upper guide rails $j^9$ is not coextensive with the lower guide rail $j^9$ but commences at the point $j^{9*}$ (see Fig. 1) leaving a space to enable the empty packet $i$ to be placed in position on the railway $j^{10}$ and between the fingers $j^8$ of the chain conveyers $j^7$ of the chain wheels $j^3$ and $j^6$. (See Figs. 1 and 2.)

The chain conveyers $j^7$ intermittently carry the packets $i$ forward so that the first packet $i$ rests beneath the delivery spout $c^{12}$ of the first feed chamber $c^*$ and then carry it into the weighing frame $h^4$ beneath the delivery spout $c^{12}$ of the second feed chamber $c$ by which time the next packet $i$ has arrived beneath the delivery spout $c^{12}$ of the feed chamber $c^*$ and the packets $i$ are thus allowed to rest as hereinafter described, and thus the packets $i$ beneath the delivery spout $c^{12}$ of the feed chamber $c^*$ is partly filled and the filling of that one beneath the delivery spout $c^{12}$ of the feed chamber $c$ is completed and that packet $i$ is weighed. (See Figs. 1 to 9.)

The first feed chamber $c^*$ in the direction of travel of the packets $i$ is preferably made of such capacity as only to partially fill a packet $i$. (See Figs. 12 and 16.)

On the lower end of the vertical shaft $j$ of the driven chain wheels $j^3$ of the chain conveyers $j^7$ is fixed a disk $j^{11}$ upon the underside of which near to its periphery are six or it might be any other suitable number of studs or rollers $j^{12}$ and beneath this disk $j^{11}$ near to one edge thereof and mounted in guides $j^{13}$ formed in the brackets $j^1$ is a sliding bar $j^{14}$ which carries a driver $j^{15}$ hereinafter referred to. (See Figs. 9, 27 and 32.)

The bar $j^{14}$ is reciprocated by means of a balanced lever $j^{19}$ at one end pivotally connected at $j^{19*}$ with the sliding bar $j^{14}$ and at the other end pivotally connected at $j^{20*}$ with one end of a link or connecting rod $j^{20}$ the other end of which is mounted upon a crank pin $d^{10**}$ carried by the feed disk $d^{10}$. (See Figs. 1, 3 and 27.)

The driver $j^{15}$ is mounted upon a vertical pin or axis $j^{16}$ carried by the sliding bar $j^{14}$ and is acted upon by a spring $j^{15*}$ to throw its free end, which is provided with a notch $j^{17}$ into engagement with one of the rollers $j^{12}$ of the chain driving disk $j^{11}$ so that in one direction of travel of the sliding bar $j^{14}$ the driver $j^{15}$ will give a partial rotation to said disk $j^{11}$ and therefore a given traverse to the chain conveyers $j^7$ equal to the distance the packets $i$ are required to travel at each operation. (See Figs. 3 and 27.)

In the return motion of the sliding bar $j^{14}$ the opposite end of the driver $j^{15}$ which driver $j^{15}$ is of a length slightly less than the distance between two adjacent rollers $j^{12}$, will come against the next succeeding roller $j^{12}$ of the chain driving disk $j^{11}$ and give to it a slight backward rotation this position of the parts being shown by the dotted roller $j^{12}$ while the extreme forward position to which the disk $j^{11}$ was carried is shown by the dotted roller $j^{12*}$ as indicated in Fig. 27.

The slight backward motion of the chain driving disk $j^{11}$ is controlled by means of a detent $j^{21}$ which engages the pins $j^{12}$ of the disk $j^{11}$ and said detent $j^{21}$ is provided with inclined extremities $j^{22}$ by which it is moved out of the path of the pins $j^{12}$ the forward motion of the disk $j^{11}$ on said incline at the same time serving to prevent the overdriving of the disk $j^{11}$. (See Fig. 27.) This backward motion of the chain driving disk $j^{11}$ moves the fingers $j^8$ of the chain conveyers $j^7$ slightly backward thus leaving the packet $i$ in the weighing frame $h^4$ perfectly free from the fingers $j^8$ of the chain conveyers $j^7$ during the weighing operation and the frictional contact of which would be prejudicial to accurate weighing. (See Fig. 27.)

When the packet $i$ in the weighing frame $h^4$ has been filled to the required extent from the feed chamber $c$ that is when the required weight of material has depressed the scale beam $h$ and the packet is ready to be carried forward by the chain conveyers $j^7$ to leave room for the succeeding packet $i$ it is necessary to momentarily prevent the rise of the weighing frame $h^4$ on the removal of the packet $i$ while the succeeding packet $i$ is carried into the weighing frame $h^4$ and this is accomplished by the following means:— (See Figs. 1 and 9:) Preferably upon the feed disk shaft $d^{12}$ adjacent to the feed disk $d^{10}$ is fixed a cam $d^{10*}$ on which rests by its truck or roller $k^1$ a vertically movable rod $k$ which is controlled by a radius link $k^2$ and the upper end of the rod $k$ is pivotally connected at $k^3$ with one arm $k^4$ of a lever which is connected with the other arm $k^5$ of said lever by a tubular connection $k^6$ mounted upon a pin $k^7$ carried by brackets $k^8$ from the table $a^1$. (See Figs. 8, 11 and 25.) The other arm or end $k^5$ of the lever is made sufficiently heavy or is weighted so that at the moment the weighing of a packet $i$ is completed said arm $k^5$ rests upon the pin or projection $h^{21}$ from the lower part of the weighing $h^4$ and holds said frame in depression as shown by the dotted lines in Fig. 9. until the filled packet $i$ is removed and another one $i$ has taken its place upon the weighing frame $h^4$ when the cam $d^{10*}$ upon the feed disk shaft $d^{12}$ lifts the rod $k$ thereby turning the lever $k^4$, $k^5$ upon its axis $k^7$ lifting the arm $k^5$ off the pin $k^{21}$ of the weighing frame $h^4$ and permitting the weighing frame $h^4$ to rise preparatory to a new packet $i$ receiving its full charge of material.

The packets $i$ on their passage between the two feed chambers $c^*$ $c$ that is when they are partially filled before weighing and also immediately after the weighing, that is when completely filled, are shaken down by a vibratory device in order to settle down their contents and this is accomplished by the following means:—(See Figs. 8, 11 and 25:) Each empty packet $i$ has temporarily fitted into its mouth a short rectangular metallic tube $i^1$ which enables the packet $i$ augmented by the metallic tube $i^1$ to receive its full quantity that is to be weighed into it and at the same time preserves the shape and keeps the mouth of the packet distended for the filling operation. (See Figs. 12 to 14.) The short metallic tube $i^1$ is provided with bent wire clips $i^2$ which embrace the packet $i$ and assist to hold the short tube in position therein and the short tube $i^1$ is provided with lateral rests $i^3$ formed of bent wire the purpose of which is hereinafter described. (See Fig. 12.)

Between the two feed chambers $c^*$ $c$ and approximately on the same level as the railway $j^{10}$ is arranged a vibratory platform $l$ a section of which also extends beyond the feed chamber $c$ and upon the platform $l$ the packets $i$ rest and travel on leaving the railway $j^{10}$. (See Fig. 27.)

On the end section of the vibratory platform $l$ is a tray $l^*$ formed with a double incline for the purpose of collecting any powdery substance that may be shaken from the packet $i$ on the platform $l$ during the vibrating movement thereof and one end of this double inclined tray $l^*$ leads to the opening $o^4$ hereinafter referred to in the table $a^1$ and the other end extends over a collecting receptacle (not shown) similar to the tray $r$ hereinafter described. (See Fig. 9.)

At the other end of the machine a shallow tray $r$ is provided to collect any powder that may fall from the packet $i$ beneath the spout $c^{12}$ of the first feed chamber $c^*$. The vibratory platform $l$ receives the necessary vertical vibratory motion to shake down the powder in the packets $i$ by the means hereinafter described. (See Figs. 9 and 32.)

The vibratory sectional platform $l$ is supported by means of links $l^1$ by one end pivotally connected thereto at $l^2$ and by the other end mounted upon axes $l^3$ carried by brackets $l^4$ from the table $a^1$. (See Figs. 9 and 32.)

Beneath one section of the vibratory platform $l$ is a wearing block and beneath the other section is a plate both of which are marked $l^6$. (See Fig. 32.)

On the main or first driven shaft $e^5$ is fixed a toothed ratchet wheel $m$ and embracing the shaft $e^5$ is loosely fitted a strap or guide $m^1$ provided with a laterally projecting adjustable stud carrying a truck or roller $m^2$ which rests upon the ratchet wheel $m$ and the strap $m^1$ which is capable of vertical movement to the desired extent is continued upwardly in the form of a rod $m^3$ and the upper end of this rod $m^3$ is pivotally connected at $m^4$ to one end of the lever $m^5$ the other end of which is fixed to a longitudinal rocking shaft $m^6$ mounted in bearings $m^*$. To this rocking shaft $m^6$ are fixed horizontal arms $m^7$ the free ends of which respectively bear against the wearing block and plate $l^6$ upon the sectional platform $l$ and thus in the rotation of the main shaft $e^5$ and ratchet wheel $m$ a vibratory movement is imparted to both parts of the sectional platform $l$. (See Figs. 2, 3, 32, 34 and 35.)

Immediately beyond the weighing frame $h^4$ the vibratory platform $l$ descends in steps $l^5$ and at about the level of the top edge of the packet $i$ proper are arranged parallel horizontal rails $l^7$ which at one end are pivotally mounted at $l^8$ upon posts $l^{7*}$ carried by the delivery conveyer frame $q^3$ hereinafter described and the other ends of said rails $l^7$ are carried by vertical bars $l^9$ connected across the top and at their lower ends fixed to the vibratory platform $l$. (See Figs. 1, 9 and 28.)

As the packet $i$ leaves the weighing frame $h^4$ and descends the steps $l^5$ of the vibratory platform $l$ the lateral projections or rests $i^3$ of the short filling tubes $i^1$ engage the rails $l^7$ with the result that the packets $i$ in their descent down the steps $l^5$ ultimately leave the short filling tubes $i^1$ suspended upon the rails $l^7$ clear of the packets $i$ as shown at Fig. 9, the powder at that time having been shaken down into place within the packets $i$ proper. (See Fig. 9.)

In the hopper $c^1$ is a weight $n$ formed conical at its ends and this weight is fixed by a spindle $n^1$ vertically movable in guides $n^2$ carried by the frame $n^3$ suspended from the junction of the two parts $c^2$ of the bifurcated hopper $c^1$ and this vertical rod $n^1$ receives a very slight vertical reciprocating movement by means of a notched or ratchet wheel $n^4$ fixed upon a shaft $n^5$ revolubly mounted in bearings in the frame $n^3$ and this shaft $n^5$ at its end is provided with a chain wheel $n^6$ which receives motion from the chain $c^6$ and the office of the weight $n$ is to agitate the powder within the hopper $c^1$ and bring about the even flow thereof. The teeth of the ratchet wheel $n^4$ are made deep and the rod $n^1$ passes through a bearing $n^{1*}$ and rests upon a regulating screw $n^7$ so that by adjusting said screw the motion of the weight $n$ can be regulated. (See Fig. 2.)

Adjacent to the weighing frame $h^4$ and the spouts $c^{12}$ of the measuring chambers $c^*$ $c$ is a conduit $o$ having an opening $o^1$ along the side immediately beneath the top thereof and the lower end of this conduit $o$ leads into a closed box or dust collector $o^2$ and said box $o^2$ is by a branch pipe $o^3$ connected with a fan and dust collector (not shown) so that any free dust is removed and preserved thus avoiding the waste which is common in filling packets with powdery material. (See Fig. 1.)

Below the weighing frame $h^4$ the table $a^1$ is formed with an opening $o^4$ which leads into the collecting box $o^2$ so that any powdery material spilled in the feeding and weighing operation is carried by the draft from the fan into the collecting box $o^2$. (See Fig. 1.)

Upon the electric contact making device $h^9$ leaving the mercury in the cup $h^{10}$ upon the rising of the weighing or scale beam $h$ by reason of the required weight of material having been deposited in the packet $i$ on the weighing frame $h^4$ and the packet $i$ having been removed from the weighing frame $h^4$ there would be in the absence of some preventive device a spark which would burn and destroy the conductivity of the point $h^9$. (See Figs. 4, 28, 29, 30 and 31.)

In order to obviate this the following device is employed to break the circuit immediately after the contact point $h^9$ enters the mercury in the cup $h^{10}$ on the completion of the weighing and until after it has left the same on the removal of the packet. (See Figs. 4, 28, 29, 30 and 31.)

Upon the feed disk shaft $d^{12}$ at the opposite end to the feed disk $d^{10}$ is provided a wheel or disk $p$ of insulating material which is carried by a metallic disk $p^1$ fixed with the shaft $d^{12}$ and said disk $p$ is formed of vulcanized fiber or other suitable material provided in its face with a brass segment $p^2$ which connects with the metal disk $p^1$. (See Fig. 10.)

The metallic disk $p^1$ is through the frame $a$ of the machine placed in circuit with the battery $x^2$ hereinbefore referred to by means of a spring contact strip $p^3$ fastened to the base of a metallic case $p^4$ inclosing the device and which contact strip $p^3$ rests in a groove formed in the periphery of the metallic disk $p^1$ and bearing upon the face of the insulating disk or wheel $p$ in the path of the brass segment $p^2$ is a brush or spring contact $p^5$ which is carried by a strip $p^6$ of insulating material fixed with the base of the case $p^4$ and this brush or contact strip $p^5$ is placed in circuit with the insulated mercury cup $h^{10}$ of the contact making device $h^9$ of the scales. (See Figs. 10 and 31.)

The insulated wheel or disk $p$ is so arranged with relation to the feed disk shaft $d^{12}$ and the brush or spring contact $p^5$ that during the weighing operation the brush $p^5$ rests in contact with the brass segment $p^2$ but immediately said shaft commences to rotate, that is when the weighing is completed, the brass segment $p^2$ is carried beyond the brush $p^5$ and the circuit is broken before the point $h^9$ of the contact making device of the scale beam $h$ leaves the mercury of the cup $h^{10}$. (See Figs. 4 to 10 and 31.)

As the filled and weighed packets $i$ leave the vibratory platform $l$ they are delivered by the chain conveyers $j^7$ to an endless traveling belt $q$ of canvas or other suitable material which passes around supporting rollers $q^1$ (one only being shown) and this roller $q^1$ is loosely mounted upon a shaft or axle $q^2$ revolubly mounted in bearings in brackets $q^6$ fixed to the table $a^1$. (See Figs. 1, 2 and 3.)

Between the supporting rollers $q^1$ is a long delivery platform $q^3$ which is supported on columns $q^5$ and the delivery part of the endless belt $q$ is supported by the continuous platform $q^3$ and the return part of the endless belt $q$ passes beneath the platform $q^3$ and over guide rollers $q^4$ carried by brackets from the platform $q^3$. (See Figs. 1 to 3.)

A step by step motion is communicated to the endless belt $q$ by the following means:—Fixed upon one end of the axle $q^2$ of the supporting roller $q^1$ is fixed an arm or offset $q^7$ near to the extremity of which is a laterally projecting pin $q^8$ upon which are pivotally mounted two weighted drivers $q^9$ provided with eccentrically rounded and roughened or serrated noses which impinge upon the periphery of the roller $q^1$. (See Figs. 1 and 3.) On the opposite end of the axle $q^2$ is fixed an arm or offset $q^{10}$ to which is pivotally connected by one end a link $q^{11}$ the other end of which link $q^{11}$ is mounted upon the crank $d^{10**}$ of the feed disk $d^{10}$ and thus in the rotation of the feed disk $d^{10}$ a reciprocating motion is given to the drivers $q^9$ which nip the supporting roller $q^1$ of the endless belt or conveyer $q$ thus imparting a step by step forward motion in excess of that given to the chain conveyers $j^7$ and by these means the filled and weighed packets $i$ are carried to any suitable position and may be removed from the endless delivery belt $q$ by hand or otherwise. (See Fig. 3.)

The electric circuit is shown diagrammatically at Fig. 31, the various magnets contacts and some other parts being lettered to correspond with the drawings but the frame and other parts of the machine which act as conductors are shown in the diagram by a dotted line and marked $x'$ while the battery which is the source of current is lettered $x^2$. (See Fig. 1.) A hand operated switch $x^3$ is however shown in the diagram but is not shown in the drawings by which the circuit may be opened and closed at will and this switch $x^3$ may be placed in any convenient position.

Although two feed chambers $c^*$ $c$ are shown in the drawings it may be pointed out that the first one $c^*$ of the feed chambers may if desired be dispensed with and the packets $i$ entirely filled beneath the feed chamber $c$ but in large machines such as that shown in the drawings it is preferable to employ the additional feed chamber $c^*$ as obviously the partial filling of the packets $i$ beneath the same quickens the working of the machine and it will be understood that with the same object the number of feed chambers may be increased if desired. (See Figs. 1 to 3.)

The general operation of the machine may be described as follows:—In describing the operation of the machine it will probably be best to describe the working from the completion of the weighing of the packet $i$ the parts of the machine generally being shown in the position they would assume immediately upon the completion of the weighing.

The chain wheel $e^2$ is by the chain $e^3$ constantly driven at a given speed from the main or first driven shaft $e^5$ of the machine and said chain wheel $e^2$ and the pinion $e'$ and part clutch $e^{1*}$ which are fixed with it are loose upon the countershaft $e$ and the pinion $e'$ through the toothed wheel $g^2$, which meshes with the constantly driven pinion $e^1$, is fixed with the lower shaft $g$ and thus gives continuous motion at a constant speed to the roughened wheel $g'$ which at given times rotates the cam wheel $f$. (See Figs. 1, 10 and 26.)

The compound wheel that is the spur wheels $d^{13}$ $d^{14}$ and the ratchet wheel $d^{15}$ and the spur wheel $e^{19}$ and casing $e^{20}$ of the free wheel clutch are therefore also constantly driven and motion is transmitted to the countershaft $e$ at the slow or finishing speed through the pinion $e'$ spur wheels $d^{13}$ $d^{14}$ $e^{19}$ and clutch $e^{20}$. (See Figs. 9 and 10.) But upon the part clutch $e^{1**}$ being thrown into engagement with the part clutch $e^{1*}$ fixed with it the motion of the pinion $e^1$ is through the part clutch $e^{1}$ transmitted to the countershaft $e$ and said shaft $e$ overruns the free wheel clutch $e^{20}$ and the clutch $e^{1}$ and consequently the shaft $e$ is therefore driven at an equal speed with the constantly driven chain wheel $e^2$. (See Figs. 9 and 10.)

The relation of the parts above described will be best understood upon reference to Figs. 9 and 10.

The packet $i$ having received its proper weight of material and consequently depressed the scale or weighing beam $h$ the contact point $h^9$ completes the electric circuit by dipping into the mercury cup $h^{10}$ at which time the contact brush or strip $p^5$ rests upon the contact $p^2$ of the insulated disk $p$ so that the circuit is completed through the magnets $c^{24}$ $d^{21}$ and the detent $c^{21}$ is retracted allowing the shutters $c^{13}$ to close under the influence of the spring $c^{15*}$ and at the same time the magnet $d^{21}$ is energized attracting the armature $d^{22}$ and causing the detent tooth $d^{24}$ to release the swinging bar $d^{19}$ thus by the action of the spring $d^{17**}$ bringing the driver $d^{17}$ into engagement with the constantly driven ratchet wheel $d^{15}$ which carries around with it the cranks $d^{16}$ $d^{16*}$ fixed on the feed disk shaft $d^{12}$ and constantly rotates said shaft and therefore the feed disk $d^{10}$. (See Figs. 1, 10, 15, 25, 26, 28, 29 and 31.)

In the rotation of the feed disk $d^{10}$ the link $j^{20}$ carries the sliding bar $j^{14}$ forward from its retracted position which is shown at Fig. 27 thus through the driver $j^{15}$ turning the chain conveyer disk $j^{11}$ and through the chain conveyers $j^7$ carrying the packet $i$ forward to a distance equal to the distance between two fingers $j^8$ on the conveyer chain $j^7$ thus traversing a packet $i$ which has been last weighted on to the stepped vibratory platform $l$ and bringing an empty packet $i$ beneath the delivery spout $c^{12}$ of the feed chamber $c^*$ and a packet $i$ which has been partially filled by the chamber $c^*$ beneath the spout $c^{12}$ of the feed chamber $c$. (See Figs. 1 to 3, 10 and 27.)

Immediately previous to the traversing of the packets $i$ as above described the rod $k$ which rests upon the cam $d^{10*}$ of the feed disk $d^{10}$ is lowered by the dwell or depression upon the cam $d^{10*}$ coming opposite the lower end of the rod $k$ and by the lowering of the rod $k$ the arm $k^5$ engages the end of the pin $h^{21}$ carried by the weighing frame $h^4$ and holds the same depressed while the partially filled packet $i$ is moved into position in the weighing frame $h^4$ after which in the rotation of the cam $d^{10*}$ the opposite movement takes place the arm $k^5$ is raised clear of the pin $h^{21}$ permitting the weighing frame $h^4$ and its packet $i$ to rise in readiness for the weighing operation. (See Figs. 8 and 32 to 35.)

Immediately that the chain conveyers $j^7$ have placed the partially filled packet $i$ in the weighing frame $h^4$ the feed disk $d^{10}$ through the link $j^{20}$ gives a slight backward movement to the sliding bar $j^{14}$ thus moving the fingers $j^8$ which have carried forward the packet $i$ to the weighing frame $h^4$ backward clear of the same so that the packet $i$ is perfectly free from frictional contact therewith. (See Figs. 1 to 9.)

In the continued rotation of the ratchet wheel $d^{15}$ which is loose upon the feed disk shaft $d^{12}$ the driver $d^{17}$ is carried around with the ratchet wheel $d^{15}$ and drives the cranks $d^{16}$ $d^{16*}$ and the pin $d^{16**}$ upon the latter crank comes against the incline $f^6$ upon the pivotal detent arm $f^3$ thus retracting the detent tooth $f^5$ from the pin $f^7$ of the cam wheel $f$ and in the continued rotation of the crank $d^{16*}$ the pin $d^{16**}$ upon the said crank $d^{16*}$ comes against the pin $f^7$ of the cam wheel $f$ thereby giving a partial rotation to said wheel $f$ thus carrying the notch or recess $f^2$ therein forward and bringing the leather covered surface $f'$ thereof into engagement with the constantly driven roughened wheel $g'$ so that the cam wheel $f$ is rotated until the recess $f^2$ again arrives at said roughened wheel $g'$. (See Figs. 1 to 9.)

In the rotation of the cam wheel $f$ the cam $f^{13}$ comes against the truck or roller $c^{31}$ of the long arm or lever $c^{28}$ and moves the latter upon its axis thus opening the feed shutters $c^{13}$ as previously described and said cam concurrently moves the lower end of the long arm or lever $c^{28}$ into such a position that the end $e^{12}$ of the bell crank lever $e^9$ is freed and permitted to swing inward under the influence of the spring $e^{9*}$ thus through the other arm of the bell crank lever $e^9$ bringing the part clutch $e^{1**}$ into engagement with the part clutch $e^{1*}$ fixed with the pinion $e^1$ loose upon the countershaft $e$ and motion is as hereinbefore explained transmitted through the chain wheel $e^2$ of the part clutch $e^{1*}$ and the part clutch $e^{1**}$ direct to the countershaft $e$ thus causing the countershaft $e$ to be driven at its normal speed for the rough or quick feed. (See Figs. 1 to 9.) This motion is transmitted by the chain wheel $e^{13}$ fixed upon the countershaft $e$ and chain $e^{14}$ to the chain wheel $e^{15}$ and thus through the miter gearing $e^{18}$ to the feed clutch shaft $d$ on which is mounted the chain wheel $d^1$ which by the chain $c^6$ gives motion to the chain wheel $c^5$ fixed upon the feed shaft $c^3$ upon which are fixed the skeleton drums or feed regulating devices $c^8$. (See Figs. 1 to 9 and 17.)

During the quick motion of the feed the packet $i$ in the weighing frame $h^4$ and therefore beneath the spout $c^{12}$ of the feed chamber $c$ is nearly completely filled and the packet $i$ beneath the spout $c^{12}$ of the feed chamber $c^*$ is partially filled. (See Figs. 1 to 9 and 16.)

The cam $f^{14}$ upon the cam wheel $f$ is so adjusted that the quick feed is continued until the packet $i$ in the weighing frame $h^4$ is nearly completely filled and then said cam $f^{14}$ comes into operation that is to say it comes against the truck or roller $e^{11}$ of the bell crank lever $e^9$ turning the same upon its axis and retracts the part clutch $e^{1**}$ as shown at Fig. 10 thereby causing the countershaft $e$ to be driven through the gearing $e^1$ $d^{13}$ $d^{14}$ $e^{19}$ and free wheel clutch $e^{20}$ at a reduced speed and the skeleton feed drums $c^8$ at a correspondingly reduced speed. (See Figs. 1 to 9.)

The slow feed continues until the required weight of material is deposited in the packet $i$ in the weighing frame $h^4$ when said frame descends and causes the scale beam $h$ to turn upon its axis thus lowering the contact point $h^9$ into the mercury of the cup $h^{10}$ and completing the electric circuit with the result that the detent $c^{21}$ controlling the shutters $c^{13}$ is retracted permitting said shutters $c^{13}$ to instantaneously close under the influence of the spring $c^{15*}$ as shown at Figs. 15 to 17 and 20. (See Figs. 1 to 9, 26, 28 and 29.)

Prior to the completion of the weighing the cam wheel $f$ has arrived at the position shown at Fig. 26 with its notch or depression $f^2$ opposite the roughened wheel $g^1$ so that it ceases to rotate. (See Fig. 26.)

Concurrently with the making of the circuit and closing of the feed shutters $c^{13}$ or shortly thereafter the feed disk $d^{10}$ commences to rotate and the lower end of the rod $d^7$ rides up out of the notch $d^{11}$ in the feed disk $d^{10}$ thus retracting the part clutch $d^3$ and stopping the feed and by the completion of the circuit the detent $d^{22}$ controlling the swinging bar $d^{19}$ is tripped permitting the swinging bar $d^{19}$ to swing toward the ratchet wheel $d^{15}$ thus placing the pawl or driver $d^{17}$ in engagement therewith. Immediately afterward the offset $d^{17*}$ of the pawl $d^{17}$ comes against the incline $d^{20}$ of the swinging bar $d^{19}$ forcing the latter outward with its tooth $d^{19*}$ in engagement with the detent tooth $d^{24}$ of the detent $d^{22}$ thus locking the swinging bar $d^{19}$ in position for its cam $d^{18}$ in the further revolution of the ratchet wheel $d^{15}$ to engage the offset $d^{17*}$ of the pawl or driver $d^{17}$ and throw the same out of engagement with the constantly driven ratchet wheel $d^{15}$ as hereinbefore described. The lower end of the rod $d^7$ concurrently falls into the notch $d^{11}$ of the feed disk $d^{10}$ thus throwing the part clutch $d^2$ into engagement with the part clutch $d^3$ and the feed recommences and at the same time the motion of the cranks $d^{16}$ $d^{16*}$ and, therefore, that of the feed disk $d^{10}$ cease. (See Figs. 1 to 9.)

By the means hereinbefore described an automatic machine is obtained capable of weighing with great exactitude granular or powdery material and especially some powders which hitherto it has been difficult or impossible to weigh in machines of this class.

I claim:

1. In an automatic machine for packeting, weighing and delivering predetermined quantities of finely divided material, a weighing beam, a weighing frame or scales carried by said beam, rails for supporting and guiding packets to and beyond the weighing frame, a feed chamber arranged over and adapted to feed material into the packet on the weighing frame, a feed regulating device for controlling the discharge from said feed chamber, means for imparting differential speeds to the feed regulating device, a shutter controlling the delivery mouth of the feed chamber, means for reducing the speed of the feed regulating device as the packet on the weighing frame receives material approaching in quantity the required weight, means for arresting the motion of the feed regulating device and means for closing the shutter when the required weight is reached, a conveyer for traversing the packets from the supporting rail on to the weighing frame and, on completion of the weighing, traversing them beyond said frame, means for freeing the conveyer from the packet during the weighing, and means for holding the weighing frame depressed while the packeting is being traversed on to and off the weighing frame.

2. In an automatic machine for packeting, weighing and delivering predetermined quantities of finely divided material, a weighing beam, a weighing frame or scales carried by said beam, rails for supporting and guiding packets to and beyond the weighing frame, a feed chamber arranged over and adapted to feed material into the packet on the weighing frame, a feed regulating device for controlling the discharge from said feed chamber, means for arresting the feed of material when the required weight is reached and means for removing dust escaping during the filling of the packet.

3. In an automatic machine for packeting, weighing and delivering given quantities of finely divided material having weighing means, a feed chamber having a circular bottom with an outlet spout, a cylinder arranged concentrically within the feed chamber, a shutter at the lower end of said cylinder, controlling the outlet spout from the feed chamber, a revoluble skeleton drum concentrically arranged and working within the space between the wall of the feed chamber and said cylinder, means for rotating the skeleton drum, means for varying the speed of and arresting said rotation at the desired times, and means for automatically closing the shutter when the required weight of material is deposited in the packet on the weighing frame.

4. In an automatic machine for packeting, weighing and delivering given quantities of finely divided material having weighing means, a feed chamber having a circular bottom with an outlet spout, a cylinder arranged concentrically within the feed chamber, a shutter at the lower end of said cylinder, controlling the outlet spout from the feed chamber, a revoluble skeleton drum concentrically arranged and working within the space between the wall of the feed chamber and said cylinder, means for rotating the skeleton drum, means for varying the speed of and arresting said rotation at the desired times, means for automatically closing the shutter when the required weight of material is deposited in the packet on the weighing frame, and means for automatically opening said shutter when the filled packet has been removed from the weighing frame and another packet placed in position to receive the material.

5. In an automatic machine for packeting, weighing and delivering given quantities of finely divided material, having a weighing frame and a feed chamber adapted to feed material into a packet on the weighing frame, additional material feeding means and parts co-acting therewith to control the delivery of material therefrom, beneath which the packets are partially filled before arriving beneath the feed chamber over the weighing frame and a brush operating at the mouth of said feed chamber substantially as and for the purpose set forth.

6. In an automatic machine for packeting, weighing and delivering given quantities of finely divided material, a weighing beam, a weighing frame suspended from the weighing beam, a bottom support for said weighing frame, guide frames at one side of said weighing frame, and resilient means on the opposite side of said weighing frame, adapted to yieldingly position the packet in the weighing frame.

7. In an automatic machine for packeting, weighing and delivering given quantities of finely divided material, a weighing beam, a weighing frame suspended from the weighing beam, a bottom support for said weighing frame, guide frames at one side of said weighing frame, and resilient means on the opposite side of said weighing frame, adapted to yieldingly position the packet in the weighing frame; and means for removing a filled packet from and introducing another packet on to the weighing frame, and means for holding the weighing frame in depressed position while said packets are being removed and introduced.

8. In an automatic machine for packeting, weighing and delivering given quantities of finely divided material having a feed chamber and an electro-magnetically actuated means for controlling the same; means for closing the circuit of said electro-magnetic means on the required weight of material being deposited in the packet; said last named means consisting of a downwardly directed crank axially carried by the weighing mechanism, an oil box in which said crank works, a metallic beam carried by the upper extremity of said crank and at its ends provided with downwardly directed contact points, and mercury cups introduced in the electric circuit to be controlled and into one of which, one of the contacts on the metallic beam is constantly immersed and in the other of which the other contact point of said beam is adapted to be immersed to close the circuit by the movement of the weighing mechanism on the required weight of material being deposited in the packet.

9. In an automatic machine for packeting, weighing and delivering given quantities of finely divided material having a feed chamber and an electro-magnetically actuated means for controlling the same; means for closing the circuit of said electro-magnetic means on the required weight of material being deposited in the packet; said last named means consisting of a downwardly directed crank axially carried by the weighing mechanism, an oil box in which said crank works, a metallic beam carried by the upper extremity of said crank and at its ends provided with downwardly directed contact points, and mercury cups introduced in the electric circuit to be controlled and into one of which, one of the contacts on the metallic beam is constantly immersed and in the other of which the other contact point of said beam is adapted to be immersed to close the circuit by the movement of the weighing mechanism on the required weight of material being deposited in the packet; there being a cover inclosing the contact beam, mercury cups and oil box, and a partition depending from the cover and dipping into the oil box between the limbs of the crank, for the purpose set forth.

10. In an automatic machine for packeting, weighing and delivering given quantities of finely divided material, a feed chamber, electro-magnetic means for controlling said feed chamber, including a mercury cup and contact point in circuit with said electro-magnetic means and means for breaking the circuit of said electro-magnetic means immediately that the contact point has entered the mercury, and keeping it broken until the contact point has left the mercury again; said last named means comprising an insulator disk, an intermittently driven shaft upon which said insulator disk is fixed, a metallic segment on said disk, placed in the electric circuit and a contact brush also in said circuit and adapted to sweep the segment; the rotation of the insulator disk being arranged to come to rest with the brush upon the segment prior to the contact point entering the mercury of the cup, on the completion of the weighing, and to rotate to break the circuit before the contact point leaves the mercury, substantially as herein set forth.

11. In an automatic machine for packeting, weighing and delivering given quantities of finely divided material; means for traversing packets beneath the point of delivery of the material and on to and beyond the weighing point; said means consisting of intermittently driven chains having suitably spaced fingers located to enter between adjacent packets and means for giving a slight backward movement to the chains after the traversing of a packet to the weighing point, and prior to the weighing operation.

12. In an automatic machine for packeting, weighing and delivering given quantities of finely divided material; means for traversing packets beneath the point of delivery of the material and onto and beyond the weighing point; said means consisting of intermittently driven chains having suitably spaced fingers located to enter between adjacent packets and means for giving a slight backward movement to the chains after the traversing of a packet to the weighing point, and prior to the weighing operation; there being suitable weighing mechanism and means being provided for holding the weighing mechanism depressed during the removal of a weighed packet therefrom and while another one is moved into position thereon.

13. In a machine for packeting, weighing and delivering given quantities of material, having a weighing frame; means for limiting the vertical movement of the weighing frame and centralizing the same; said means comprising a pin upon the weighing frame, and a plate carried by a fixed part and having a V-shaped slot therein adapted to receive the pin.

14. In a machine for packeting, weighing and delivering material, having a weighing frame and means for traversing packets onto and beyond the weighing frame; means for preventing the forward motion of the weighing frame under the influence of the moving packet, consisting of lateral studs on the weighing frame and inclined stops or guides upon fixed parts, with which said studs engage.

15. In a machine for packeting, weighing and delivering material, having weighing mechanism and means for traversing the packets onto and beyond the weighing mechanism; means for shaking down the weighed material in the packets, consisting of a constantly vibrating platform upon which the packets are received after leaving the weighing mechanism.

16. In a machine for packeting, weighing and delivering material, having weighing mechanism and means for traversing the packets onto and beyond the weighing mechanism; means for shaking down the weighed material in the packets, consisting of a constantly vibrating platform upon which the packets are received after leaving the weighing mechanism; there being for each packet to be filled, a short filling tube fitted with clips which embrace the packet and having lateral rests, and there being rails adapted to engage said rests as each filled packet leaves the weighing mechanism said vibratory platform being adapted to receive the packet as it leaves the weighing mechanism; said platform being constructed in steps and arranged to carry one end of the rails substantially as set forth.

17. In a machine for packeting, weighing and delivering material, a feed disk shaft, a counter shaft, a compound wheel, loose on the feed disk shaft, said compound wheel consisting of a spur pinion, a spur wheel and a ratchet wheel, a spur wheel loose upon the counter shaft, a free wheel clutch connecting said spur wheel with said counter shaft, said spur wheel engaging the spur pinion of the compound wheel of the feed disk shaft, a constantly driven chain wheel, a spur pinion fixed with said chain wheel but loose upon the counter shaft and engaging the spur wheel of the compound wheel, a clutch member upon the spur pinion of the counter shaft, a co-acting clutch member slidably keyed with the counter shaft, means for throwing said clutch members into and out of engagement at times desired and thereby varying the speed of the counter shaft, and means for conveying motion from the counter shaft to the feed mechanism.

18. In a machine for packeting, weighing and delivering material, having a feed chamber, a feed shaft for controlling the feed of material from said chamber and means through which to actuate said feed shaft; said last named means comprising a bell-crank, a slidable clutch member engaged by said bell-crank, a counter shaft upon which said clutch member is mounted, a lower shaft parallel with the counter shaft, a spur wheel fixed on said lower shaft, a constantly driven spur wheel loose upon the counter-shaft, which meshes with the spur wheel on said lower shaft, a constantly driven roughened wheel fixed upon said lower shaft, a cam wheel having a break or depression in its periphery, loose upon the counter shaft and engaging the roughened wheel, means for giving a partial rotation to the cam wheel and bringing its periphery into engagement with the roughened wheel at the times desired, a spring for turning the bell-crank upon its axis so as to throw the clutch member of the counter shaft into engagement, a latch or detent for retaining the bell-crank with the clutch member out of engagement, and two cams upon the face of the cam wheel, one adapted to turn the bell-crank so as to disengage the clutch member, and the other to trip the latch or detent and permit the spring to throw the clutch member into engagement.

19. In a machine for packeting, weighing and delivering material, having a feed chamber, a feed shaft for controlling the feed of material from said chamber and means through which to actuate said feed shaft; said last named means comprising a bell-crank, a slidable clutch member engaged by said bell-crank, a counter shaft upon which said clutch member is mounted, a lower shaft parallel with the counter shaft, a spur wheel fixed on said lower shaft, a constantly driven spur wheel loose upon the counter-shaft, which meshes with the spur wheel on said lower shaft, a constantly driven roughened wheel fixed upon said lower shaft, a cam wheel having a break or depression in its periphery, loose upon the counter shaft and engaging the roughened wheel, means for giving a partial rotation to the cam wheel and bringing its periphery into engagement with the roughened wheel at the times desired, a spring for turning the bell-crank upon its axis so as to throw the clutch member of the counter-shaft into engagement, a latch or detent for retaining the bell-crank with the clutch member out of engagement, and two cams upon the face of the cam wheel, one adapted to turn the bell-crank so as to disengage the clutch member, and the other to trip the latch or detent and permit the spring to throw the clutch member into engagement; means being provided for adjusting the position of the cam for disengaging the clutch member relatively to the other cam.

20. In a machine for packeting, weighing and delivering material, having a feed chamber, a feed shaft for controlling the feed of material from said chamber and means through which to actuate said feed shaft; said last named means comprising a bell-crank, a slidable clutch member engaged by said bell-crank, a counter shaft upon which said clutch member is mounted, a lower shaft parallel with the counter shaft, a spur wheel fixed on said lower shaft, a constantly driven spur wheel loose upon the counter-shaft, which meshes with the spur wheel on said lower shaft, a constantly driven roughened wheel fixed upon said lower shaft, a cam wheel having a break or depression in its periphery, loose upon the counter shaft and engaging the roughened wheel, means for giving a partial rotation to the cam wheel and bringing its periphery into engagement with the roughened wheel at the times desired, a spring for turning the bell-crank upon its axis so as to throw the clutch member of the counter shaft into engagement, a latch or detent for retaining the bell-crank with the clutch member out of engagement, and two cams upon the face of the cam wheel, one adapted to turn the bell-crank so as to disengage the clutch member, and the other to trip the latch or detent and permit the spring to throw the clutch member into engagement; means being provided for giving an initial impulse to the cam wheel, in order to carry the break or depression therein beyond the roughened wheel and bring its periphery into engagement with said roughened wheel; said initial impulse means comprising a crank on the feed shaft provided with a pin, a co-acting pin on the cam wheel against which the pin of the crank comes in the rotation of the feed shaft, a swinging detent for engaging the pin on the cam wheel and locking said wheel with its break opposite the roughened wheel, said detent being arranged in the path of the pin of the crank and being disengaged by the crank pin before giving the initial impulse to the cam wheel.

21. In a machine for packeting, weighing and delivering material, having a feed chamber with feeding mechanism and a feed shaft; means for intermittently driving the feed shaft comprising a compound wheel having a ratchet wheel, a crank fitted with the feed shaft, a spring actuated pawl carried by said crank and adapted to engage said ratchet wheel, a swinging bar provided with a cam, adapted, in the rotation of the crank and with the arm in a certain position, to engage the pawl and hold it out of gear with the ratchet wheel, so that the feed shaft remains stationary while the feed is taking place, a detent for holding the swinging bar in a position for its own cam to engage the pawl and an electro-magnet placed in a suitable circuit and adapted to trip the detent upon the completion of the weighing of the packet and to permit the pawl to engage the ratchet wheel.

22. In a machine for packeting, weighing and delivering material, having a feed chamber with feeding mechanism and a feed shaft; means for intermittently driving the feed shaft comprising a compound wheel having a ratchet wheel, a crank fitted with the feed shaft, a spring actuated pawl carried by said crank and adapted to engage said ratchet wheel, a swinging bar provided with a cam, adapted, in the rotation of the crank and with the arm in a certain position, to engage the pawl and hold it out of gear with the ratchet wheel, so that the feed shaft remains stationary while the feed is taking place, a detent for holding the swinging bar in a position for its own cam to engage the pawl and an electro-magnet placed in a suitable circuit and adapted to trip the detent upon the completion of the weighing of the packet and to permit the pawl to engage the ratchet wheel; means being provided to insure the separation of the detent from the magnet, consisting of an incline on the detent adapted to be engaged by the pawl substantially as set forth.

23. In a machine for packeting, weighing and delivering material, conveyers for the packets and means for giving motion to said conveyers; said means consisting of a shaft, chain wheels fixed upon said shaft and receiving the packet conveyers, a conveyer disk fixed upon said shaft having pins suitably spaced around its circumference, a sliding bar, a pivotal driver carried by said sliding bar and shaped to engage said pins, a balanced lever pivotally connected with said sliding bar, a feed disk, a crank-pin on said feed disk, a link connecting said crank pin with the balanced lever so that in the rotation of the feed disk, a reciprocating motion is given to the sliding bar and therefore a step by step rotary motion, is given through the driver and disk carrying the pins, to the conveyer shaft, and means for preventing the over driving of said shaft.

24. In a machine for packeting, weighing and delivering material, conveyers for the packets and means for giving motion to said conveyers; said means consisting of a shaft, chain wheels fixed upon said shaft and receiving the packet conveyers, a conveyer disk fixed upon said shaft having pins suitably spaced around its circumference, a sliding bar, a pivotal driver carried by said sliding bar and shaped to engage said pins, a balanced lever pivotally connected with said sliding bar, a feed disk, a crank-pin on said feed disk, a link connecting said crank pin with the balanced lever so that in the rotation of the feed disk, a reciprocating motion is given to the sliding bar and therefore a step by step rotary motion, is given through the driver and disk carrying the pins, to the conveyer shaft, and means for preventing the over driving of said shaft; said driver having a heel and said conveyer disk having one of its pins engaged by said heel in the return traverse of the sliding bar whereby a slight backward motion is imparted to the disk to remove the conveyer clear of the packet being weighed.

25. In a machine for packeting, weighing and delivering material, conveyers for the packets and means for giving motion to said conveyers; said means consisting of a shaft, chain wheels fixed upon said shaft and receiving the packet conveyers, a conveyer disk fixed upon said shaft having pins suitably spaced around its circumference, a sliding bar, a pivotal driver carried by said sliding bar and shaped to engage said pins, a balanced lever pivotally connected with said sliding bar, a feed disk, a crank-pin on said feed disk, a link connecting said crank pin with the balanced lever so that in the rotation of the feed disk, a reciprocating motion is given to the sliding bar and therefore a step by step rotary motion, is given through the driver and disk carrying the pins, to the conveyer shaft, and means for preventing the over driving of said shaft; said driver having a heel and said conveyer disk having one of its pins engaged by said heel in the return traverse of the sliding bar whereby a slight backward motion is imparted to the disk to remove the conveyer clear of the packet being weighed, and means being provided for limiting the backward movement of the conveyer disk.

26. In a machine for packeting, weighing and delivering goods, a feed chamber, a skeleton feed drum in said chamber, and means for giving motion to and interrupting the motion of said feed drum; said last named means comprising a feed clutch shaft, a counter shaft continuously driving said feed clutch shaft, means for varying the speed of said driving shaft, a clutch member slidably but non-rotatably fixed upon said feed clutch shaft, a coöperating clutch member loose upon said feed clutch shaft, but fixed with the feed drum, a bell-crank adapted to engage through one arm, the slidable clutch member, a feed clutch rod for one end connected to the other end of said bell-crank, a roller carried by the other end of said feed clutch rod, a feed disk upon the periphery of which said roller runs, a depression in said periphery, into which said roller is adapted to take, to throw the slidable clutch member into engagement with the feed clutch, so that the feed may take place.

In witness whereof I have hereunto set my hand in the presence of two witnesses.

GEORGE PROKOFIEW.

Witnesses:
C. MELBOURNE WHITE,
C. H. WHITE.

Copies of this patent may be obtained for five cents each, by addressing the "Commissioner of Patents, Washington, D. C."